US012189126B2

(12) United States Patent
Ouderkirk et al.

(10) Patent No.: US 12,189,126 B2
(45) Date of Patent: *Jan. 7, 2025

(54) COMPACT POLARIZED ILLUMINATORS USING REFLECTIVE POLARIZERS

(71) Applicant: 3M INNOVATIVE PROPERTIES COMPANY, St. Paul, MN (US)

(72) Inventors: Andrew J. Ouderkirk, St. Paul, MN (US); Erin A. McDowell, Afton, MN (US); Zhisheng Yun, Woodbury, MN (US)

(73) Assignee: 3M INNOVATIVE PROPERTIES COMPANY, St. Paul, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/093,518

(22) Filed: Jan. 5, 2023

(65) Prior Publication Data

US 2023/0152590 A1    May 18, 2023

Related U.S. Application Data

(60) Continuation of application No. 17/248,963, filed on Feb. 16, 2021, now Pat. No. 11,579,452, which is a (Continued)

(51) Int. Cl.
*G02B 27/01* (2006.01)
*G03B 21/20* (2006.01)
(Continued)

(52) U.S. Cl.
CPC ..... *G02B 27/0172* (2013.01); *G03B 21/2033* (2013.01); *G03B 21/2066* (2013.01);
(Continued)

(58) Field of Classification Search
CPC ............ G02B 27/0172; G03B 21/2033; G03B 21/2066; G03B 21/2073; H04N 9/3167
See application file for complete search history.

(56) References Cited

U.S. PATENT DOCUMENTS 5,499,138 A    3/1996 Iba
5,648,860 A    7/1997 Ooi
(Continued)

FOREIGN PATENT DOCUMENTS

CN    1479130    3/2004
CN    103424977    12/2013
(Continued)

OTHER PUBLICATIONS

International Search report for PCT International Application No. PCT/US2015/066563 mailed on Jun. 3, 2016, 7 pages.

*Primary Examiner* — Bao-Luan Q Le
(74) *Attorney, Agent, or Firm* — Jonathan L. Tolstedt

(57) ABSTRACT

Projection systems and components thereof are described that are well suited to miniaturization. These systems and components may use one or more of the following features: a folded optical path, as in a reflective cavity or a beamsplitter; an illumination beam that is converging at the place where it impinges upon the spatial light modulator; a beamsplitter that uses opposed prisms of substantially different sizes; a beamsplitter whose obliquely disposed partial reflector defines a first rectangular reference space, and where at least a portion of the light source or at least a portion of the projector lens is disposed within such first rectangular reference space; a system in which a ratio of areas of the first rectangular reference space and a second rectangular reference space is within a specified range, where the second rectangular reference space is just large enough to encompass the optical components of the projector; a system in which the projector lens is small compared to the spatial light modulator.

6 Claims, 21 Drawing Sheets

Related U.S. Application Data division of application No. 15/536,703, filed as application No. PCT/US2015/066563 on Dec. 18, 2015, now Pat. No. 10,955,666.

(60) Provisional application No. 62/099,138, filed on Dec. 31, 2014.

(51) Int. Cl.

| | |
|---|---|
| *H04N 9/31* | (2006.01) |
| *F21K 9/61* | (2016.01) |
| *G02B 27/28* | (2006.01) |
| *G02F 1/13* | (2006.01) |
| *G02F 1/1335* | (2006.01) |
| *G03B 33/12* | (2006.01) |

(52) U.S. Cl.
CPC ....... *G03B 21/2073* (2013.01); *H04N 9/3167* (2013.01); *F21K 9/61* (2016.08); *G02B 27/286* (2013.01); *G02F 1/1313* (2013.01); *G02F 1/133536* (2013.01); *G03B 33/12* (2013.01); *H04N 9/3105* (2013.01)

(56) References Cited

U.S. PATENT DOCUMENTS

| | | | |
|---|---|---|---|
| 5,882,774 A | 3/1999 | Jonza | |
| 5,943,171 A | 8/1999 | Budd | |
| 6,075,651 A | 6/2000 | Hoppe | |
| 6,208,451 B1 | 3/2001 | Itoh | |
| 6,208,463 B1 | 3/2001 | Hansen | |
| 6,266,194 B1 | 7/2001 | Tanijiri | |
| 6,271,969 B1 | 8/2001 | Mertz | |
| 6,331,916 B1* | 12/2001 | Mukawa | G02B 27/0172 359/630 |
| 6,519,090 B2 | 2/2003 | Endo | |
| 6,646,809 B1* | 11/2003 | Ishino | G02B 27/0172 359/633 |
| 6,714,350 B2 | 3/2004 | Silverstein | |
| 6,719,426 B2 | 4/2004 | Magarill | |
| 6,836,309 B2 | 12/2004 | Anderson | |
| 6,844,971 B2 | 1/2005 | Silverstein | |
| 6,864,861 B2 | 3/2005 | Schehrer | |
| 6,952,312 B2 | 10/2005 | Weber | |
| 6,976,759 B2 | 12/2005 | Magarill | |
| 7,002,751 B2 | 2/2006 | Kobayashi | |
| 7,267,441 B2 | 9/2007 | Lee | |
| 7,267,446 B2 | 9/2007 | Lee | |
| 7,362,507 B2 | 4/2008 | Duncan | |
| 7,369,320 B2 | 5/2008 | Destain | |
| 7,455,409 B2 | 11/2008 | Kim | |
| 7,540,616 B2 | 6/2009 | Conner | |
| 7,545,571 B2 | 6/2009 | Garoutte | |
| 7,589,902 B2 | 9/2009 | Garoutte | |
| 7,703,925 B2 | 4/2010 | Ko | |
| 7,798,677 B2 | 9/2010 | Huang | |
| 7,798,678 B2 | 9/2010 | Destain | |
| 7,934,840 B2 | 5/2011 | Hwang | |
| 8,075,140 B2 | 12/2011 | Phillips | |
| 8,373,923 B2 | 2/2013 | Hikmet | |
| 8,388,190 B2 | 3/2013 | Li | |
| 8,459,798 B2 | 6/2013 | Fujinawa | |
| 8,482,549 B2 | 7/2013 | Liu | |
| 8,493,520 B2 | 7/2013 | Gay | |
| 8,780,039 B2 | 7/2014 | Gay | |
| 8,896,769 B2 | 11/2014 | Huang | |
| 8,905,555 B2 | 12/2014 | Jeon | |
| 9,004,693 B2 | 4/2015 | Huang | |
| 9,348,208 B2 | 5/2016 | Suga | |
| 9,651,790 B2 | 5/2017 | Takahara | |
| 9,756,300 B2 | 9/2017 | Sheng | |
| 9,958,699 B2 | 5/2018 | Watson | |
| 2001/0012092 A1 | 8/2001 | Knox | |
| 2002/0015114 A1* | 2/2002 | Okuyama | G02B 27/0172 349/137 |
| 2002/0015116 A1 | 2/2002 | Park | |
| 2002/0018185 A1* | 2/2002 | Kuramochi | G03B 13/08 353/69 |
| 2002/0018295 A1* | 2/2002 | Okuyama | G02B 27/0172 359/443 |
| 2002/0021498 A1* | 2/2002 | Ohtaka | G02B 27/0172 359/638 |
| 2002/0036831 A1* | 3/2002 | Inoguchi | G02B 27/0172 359/629 |
| 2002/0051118 A1* | 5/2002 | Takagi | G02B 27/0172 348/E13.047 |
| 2002/0057498 A1 | 5/2002 | Kobayashi | |
| 2002/0063818 A1 | 5/2002 | Anderson | |
| 2003/0072079 A1 | 4/2003 | Silverstein | |
| 2003/0117595 A1 | 6/2003 | Li | |
| 2003/0210379 A1 | 11/2003 | Magarill | |
| 2003/0218686 A1 | 11/2003 | Lundgren | |
| 2004/0014504 A1 | 1/2004 | Coates | |
| 2004/0120041 A1 | 6/2004 | Silverstein | |
| 2004/0233393 A1 | 11/2004 | Magarill | |
| 2005/0140932 A1 | 6/2005 | Magarill | |
| 2005/0259224 A1 | 11/2005 | Lee | |
| 2005/0259229 A1 | 11/2005 | Lee | |
| 2006/0098293 A1 | 5/2006 | Garoutte | |
| 2006/0244919 A1 | 11/2006 | Chuang | |
| 2006/0262514 A1 | 11/2006 | Conner | |
| 2007/0030456 A1 | 2/2007 | Duncan | |
| 2007/0046896 A1 | 3/2007 | Ko | |
| 2007/0104073 A1 | 5/2007 | Kato | |
| 2007/0146639 A1 | 6/2007 | Conner | |
| 2007/0263174 A1 | 11/2007 | Shyu | |
| 2007/0291491 A1 | 12/2007 | Li | |
| 2008/0013185 A1 | 1/2008 | Garoutte | |
| 2009/0015917 A1 | 1/2009 | Iwamoto | |
| 2009/0116214 A1 | 5/2009 | Phillips, III | |
| 2009/0179827 A1 | 7/2009 | Oakley | |
| 2009/0190101 A1 | 7/2009 | Alasaarela | |
| 2009/0201791 A1 | 8/2009 | Hotta | |
| 2009/0244488 A1 | 10/2009 | Tang | |
| 2009/0268166 A1 | 10/2009 | Chen | |
| 2009/0268469 A1 | 10/2009 | Huang | |
| 2010/0195056 A1 | 8/2010 | Yoo | |
| 2010/0290008 A1 | 11/2010 | Suga | |
| 2011/0013146 A1 | 1/2011 | Fujinawa | |
| 2011/0037951 A1* | 2/2011 | Hua | G02B 5/3083 359/663 |
| 2012/0062846 A1 | 3/2012 | Dike | |
| 2012/0140184 A1 | 6/2012 | Bruzzone | |
| 2012/0256879 A1 | 10/2012 | Liu | |
| 2012/0268720 A1 | 10/2012 | Wang | |
| 2012/0300180 A1 | 11/2012 | Jeon | |
| 2013/0044293 A1* | 2/2013 | Willett | G02B 13/16 353/20 |
| 2013/0057961 A1 | 3/2013 | Evans | |
| 2013/0148040 A1* | 6/2013 | Huang | G02F 1/13362 349/5 |
| 2014/0176818 A1 | 6/2014 | Watson | |
| 2014/0211173 A1 | 7/2014 | Destain | |
| 2015/0138446 A1 | 5/2015 | Sheng | |
| 2015/0160462 A1 | 6/2015 | Takahara | |
| 2015/0185480 A1 | 7/2015 | Ouderkirk | |
| 2016/0239985 A1 | 8/2016 | Haddick | |
| 2016/0240008 A1 | 8/2016 | Haddick | |
| 2016/0269698 A1 | 9/2016 | Gao | |
| 2016/0282626 A1 | 9/2016 | Border | |
| 2016/0286177 A1 | 9/2016 | Border | |
| 2016/0286203 A1 | 9/2016 | Border | |
| 2016/0286210 A1 | 9/2016 | Border | |
| 2017/0017077 A1 | 1/2017 | Tang | |

FOREIGN PATENT DOCUMENTS

| | | |
|---|---|---|
| EP | 0837351 | 4/1988 |
| GB | 0821776 | 10/1959 |
| GB | 2347553 | 9/2000 |
| GB | 2449682 | 12/2008 |

(56) References Cited

FOREIGN PATENT DOCUMENTS

| | | |
|---|---|---|
| JP | 2013-130647 | 7/2013 |
| KR | 2000-0071356 | 3/2005 |
| RU | 2143718 | 12/1999 |
| WO | WO 1999-59008 | 11/1999 |
| WO | WO 2002-44764 | 6/2002 |
| WO | WO 2003-075076 | 9/2003 |
| WO | WO 2010-061755 | 6/2010 |
| WO | WO 2014-093085 | 6/2014 |
| WO | WO 2015-142654 | 9/2015 |

* cited by examiner

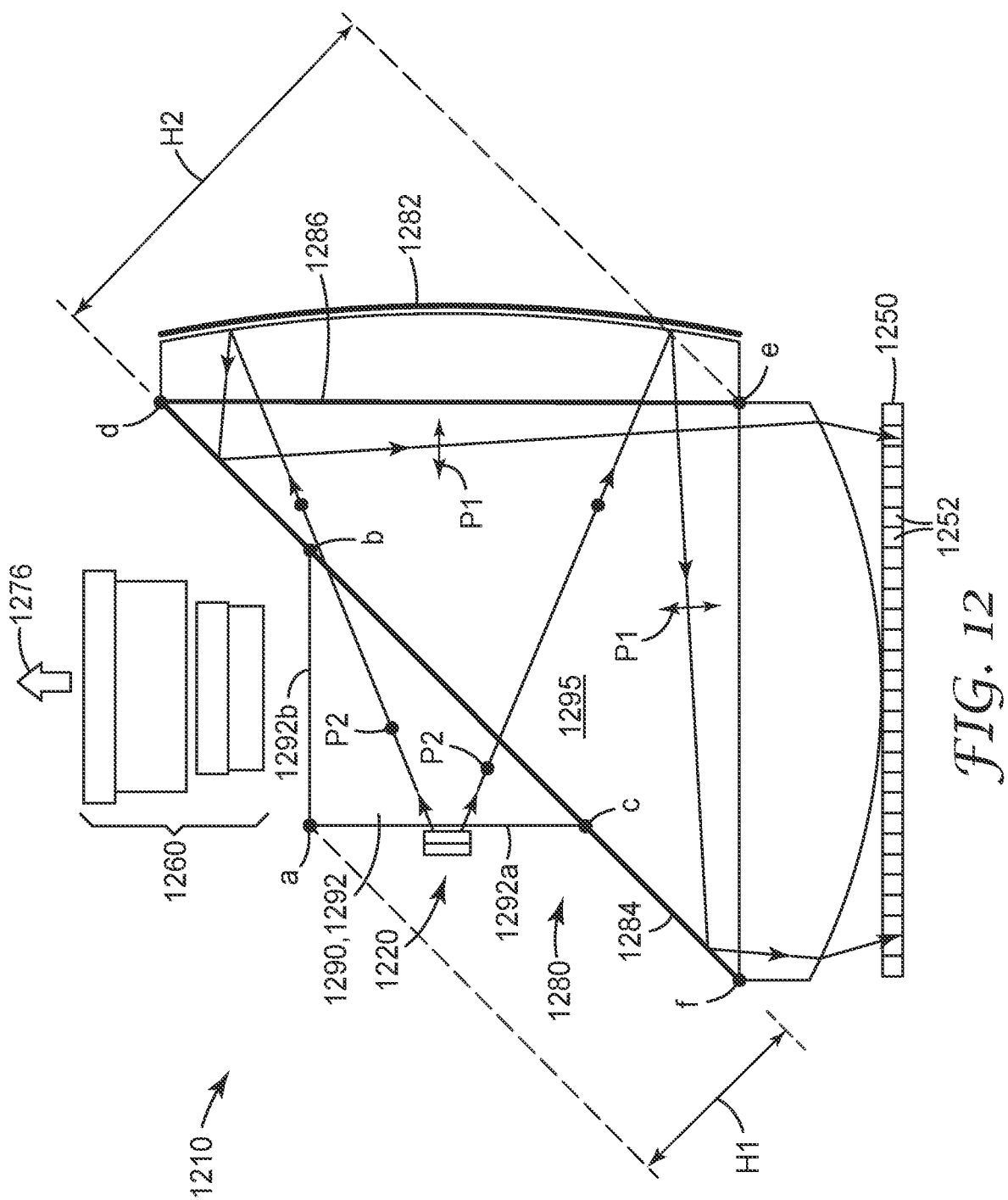

COMPACT POLARIZED ILLUMINATORS USING REFLECTIVE POLARIZERS

CROSS REFERENCE TO RELATED APPLICATION

This application is a continuation filing of U.S. application Ser. No. 17/248,963, filed Feb. 16, 2021, now allowed, which is a divisional filing of U.S. application Ser. No. 15/536,703, filed Jun. 16, 2017, issued as U.S. Pat. No. 10,955,666, which is a national stage filing under 35 C.F.R. 371 of PCT/US15/66563, filed Dec. 18, 2015, which claims the benefit of U.S. Provisional Application No. 62/099,138, filed Dec. 31, 2014, the disclosures of which are incorporated by reference in their entireties herein.

FIELD OF THE INVENTION

This invention relates generally to optical projection systems, with particular application to such systems that are small in size, e.g., small enough so that all of the optical components of the projection system can fit within the palm of one's hand, or so that the projection system can be incorporated into a device or apparatus that can be worn by a user, such as a helmet, eyewear, or other headgear. The invention also relates to components relating to such projection systems, such as compact polarized illuminators, compact polarizing beamsplitters, and related articles, systems, and methods.

BACKGROUND

Projection systems and components such as illuminators and beamsplitters, including polarized illuminators and polarizing beamsplitters, are known. However, many such systems and components are not designed to provide high efficiency or high brightness in a small physical size suitable for use in compact applications, such as wearable or pocket-sized electro-optical devices.

BRIEF SUMMARY

We have developed new families of projection systems, and related components such as polarized illuminators and polarizing beamsplitters, that are highly suited for use in compact applications. In some cases, miniaturization is enabled or promoted by the use of a folded optical path, as provided in a reflective cavity or a beamsplitter. In some cases, miniaturization is promoted by the use of an illumination beam that converges at the location where it impinges upon a spatial light modulator. In some cases, miniaturization is promoted by the use of a beamsplitter that comprises opposed prisms of substantially different sizes. In some cases, miniaturization is promoted by beamsplitters whose obliquely disposed partial reflector defines a first rectangular reference space, and where at least a portion of a light source or at least a portion of a projector lens is disposed within such first rectangular reference space. In some cases, miniaturization is exemplified by systems in which a ratio of areas of the first rectangular reference space and a second rectangular reference space is within a range from 30% to 70%, where the second rectangular reference space is just large enough to encompass the optical components of the projector. In some cases, miniaturization is promoted by the use of projector lens that is small compared to the spatial light modulator, e.g., a lateral dimension of the projector lens, and/or one or more of its individual lenses, may be no more than 30% or 50% or 70% of the corresponding lateral dimension of the spatial light modulator.

We disclose for example compact projectors that include a beamsplitter, a light source, a spatial light modulator, and a projector lens. The beamsplitter includes a reflective polarizer, the reflective polarizer obliquely disposed to define a diagonal of a first rectangular reference space. The light source is disposed proximate the reflective polarizer and is configured to emit an input light beam towards the reflective polarizer. The spatial light modulator is disposed to receive an output illumination beam derived from the input light beam, the spatial light modulator adapted to selectively reflect the output illumination beam to provide a patterned light beam, which the projector lens is adapted to receive. The beamsplitter, the light source, the spatial light modulator, and the projector lens are encompassed by a second rectangular reference space. The first rectangular reference space has an area A1 and the second rectangular reference space has an area A2, and 30%<A1/A2<70%.

We disclose projectors that include a reflective polarizer, a light source, a spatial light modulator, and a projector lens. The reflective polarizer is obliquely disposed to define a diagonal of a first rectangular reference space. The light source is disposed proximate the reflective polarizer and is configured to emit an input light beam towards the reflective polarizer. The spatial light modulator is disposed to receive an output illumination beam derived from the input light beam, and adapted to selectively reflect the output illumination beam to provide a patterned light beam. The projector lens is adapted to receive the patterned light beam. At least a portion of the light source, or at least a portion of the projector lens, is disposed within the first rectangular reference space.

We disclose beamsplitters that include a first prismatic body comprising a first prism, a second prismatic body comprising a second prism, and a reflective polarizer sandwiched between the first and second prismatic bodies. The first prism is substantially smaller than the second prism.

We disclose illuminators that include a reflector and a reflective polarizer disposed to form a reflective cavity with the reflector. The illuminators also include a retarder film disposed within the reflective cavity, and a light source disposed to emit a polarized input light beam into the reflective cavity through an aperture in the reflector. The reflector, the reflective polarizer, and the retarder film are configured to produce an output illumination beam from the input light beam, and the output illumination beam is polarized.

We disclose illuminators that include a reflector, a reflective polarizer disposed obliquely relative to the reflector, and a retarder film disposed between the reflector and the reflective polarizer, and a light source disposed to emit an input light beam of a first polarization state through the reflective polarizer towards the reflector. The reflector, the reflective polarizer, and the retarder film are configured to produce an output illumination beam from the input light beam, and the output illumination beam has a second polarization state orthogonal to the first polarization state.

We also disclose projectors that include the foregoing illuminators.

Related methods, systems, and articles are also discussed.

These and other aspects of the present application will be apparent from the detailed description below. In no event, however, should the above summaries be construed as limitations on the claimed subject matter, which subject matter is defined solely by the attached claims, as may be amended during prosecution.

BRIEF DESCRIPTION OF DRAWINGS

The inventions will now be described with reference to the following figures, in which:

FIG. 12 is a schematic top or side view of another compact projection system, this projector also having an illuminator that uses a polarizing beamsplitter of substantially different prism sizes;

In the figures, like reference numerals designate like elements.

DETAILED DESCRIPTION OF ILLUSTRATIVE EMBODIMENTS

As mentioned above, we have developed new families of projection systems and components thereof that are well suited to miniaturization. These systems and components may use one or more of the following features: a folded optical path, as in a reflective cavity or a (e.g. polarizing) beamsplitter; an illumination beam that is converging at the place where it impinges upon the spatial light modulator; a beamsplitter that uses opposed prisms of substantially different sizes; a beamsplitter whose obliquely disposed partial reflector defines a first rectangular reference space, and where at least a portion of the light source or at least a portion of the projector lens is disposed within such first rectangular reference space; a system in which a ratio of areas of the first rectangular reference space and a second rectangular reference space is within a range from 30% to 70% or 40% to 70%, where the second rectangular reference space is just large enough to encompass the optical components of the projector such as a beamsplitter, the light source, the spatial light modulator, and the projector lens; a system in which the projector lens is small compared to the active area of the spatial light modulator, e.g., a lateral dimension of the projector lens, and/or one or more of its individual lenses, may be no more than 30% or 50% or 70% of the corresponding lateral dimension of the spatial light modulator; a system in which the collection efficiency of the projector lens is substantially uniform over the area of the spatial light modulator.

Figure 1:
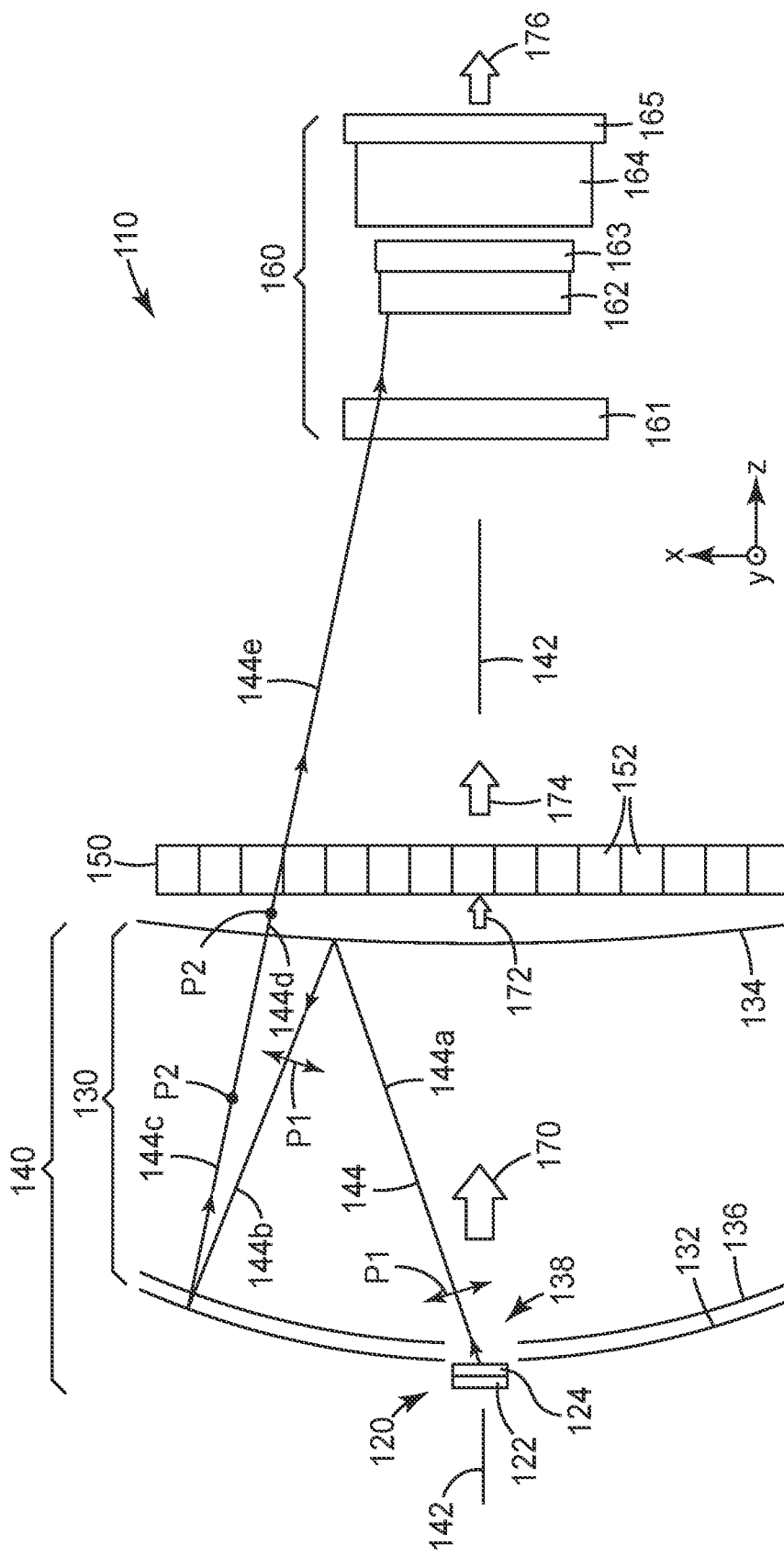
FIG. 1 is a schematic top view of a compact projection system.

Turning then to FIG. 1, we see there a schematic top view of a compact projector 110. For reference purposes, the projector 110 is drawn in the context of a Cartesian x-y-z coordinate system, where it is assumed that the x-z plane defines a horizontal plane and the y-axis is a vertical axis, but other conventions may also be used. The projector 110 includes an illuminator 140, a spatial light modulator 150, and a projector lens 160. The z-axis of the coordinate system is assumed to be parallel to an optical axis 142 of the projector 110 and its component parts. The illuminator 140 produces an output illumination beam 172 that impinges upon the spatial light modulator 150. In exemplary embodiments, the output illumination beam 172 is substantially spatially uniform over the entire active area of such modulator 150, so that the brightness of the projected image is also substantially uniform.

A conventional electronic controller (not shown) couples to the spatial light modulator 150 and controls the states of the individual elements (pixel elements) 152 in an imagewise fashion. The pixel elements 152 are usually arranged in a grid of rows and columns to provide a rectangular active area. A given pixel element 152 may have two states—"on" or "off", as in the case of a monochrome display—or it may have red, green, and blue sub-elements to provide a full color image. Other conventional configurations of the spatial light modulator 150 are also contemplated. In the embodiment of FIG. 1, the spatial light modulator 150 is a transmissive-type modulator. The spatial light modulator 150 thus converts the output illumination beam 172 into a transmitted patterned light beam 174 which contains the image-wise or spatially patterned information from the electronic controller. The modulator 150 may be a non-polarized transmissive device, such as a microelectromechanical system (MEMS), or it may be a liquid crystal based modulator. In the latter case, the modulator 150 selectively rotates the polarization of the light exiting the array of pixels, and further in that case a polarizer (not shown) is inserted into the projector 110 after the spatial light modulator to filter out "on" pixels from "off" pixels.

The patterned light beam 174 is then intercepted by the projector lens 160 to produce a projected output beam 176. The output beam 176 may produce a real image, e.g. an image that can be displayed on a physical surface or substrate remotely disposed relative to the projector 110, or it may produce a virtual image, e.g. one that may be viewed directly by the eye of a user. The projector lens 160 typically, but not in all cases, is a module that includes a plurality of individual lenses arranged in series. In the embodiment of FIG. 1, the projector lens 160 includes individual lenses 161, 162, 163, 164, and 165. These lenses are drawn schematically, but the reader will understand that the individual lenses have curved surfaces, suitable thicknesses, and are composed of suitable optical glasses or plastics, to provide high quality optical performance. In one exemplary embodiment, the projector lens is a five-element module containing five individual lenses as set forth in the table provided further below. In an alternative embodiment, a four-element projector lens can be obtained by omitting the fifth lens (lens 5) from referenced five-element projector lens. The scale of FIG. 1 is accurate in the sense that the projector lens 160, and its individual lenses, each have a lateral dimension (e.g. parallel to the x-axis, or parallel to the y-axis, or along a diagonal of the spatial light modulator 150) that is substantially smaller than a corresponding lateral dimension of the spatial light modulator 150. This is made possible by the fact that the output illumination beam 172 is a converging beam. For example, the lateral dimension of the projector lens 160, and/or one or more of its individual lenses, may be no more than 30% or 50% or 70% of the corresponding lateral dimension of the spatial light modulator 150. In an exemplary embodiment based on the projector lens table provided further below, the lateral dimension of the (five-element) projector lens is 2.88 mm and the length of the diagonal of the 5:4 spatial light modulator is 6 mm, for a percentage of 48%. The lateral dimension of the individual lens closest to the spatial light modulator is 2.8 mm, for a percentage of 47%.

The purpose of the illuminator 140 is to illuminate the active area of the spatial light modulator 150 so that an optical image or pattern can be produced. In many, but not all, cases, it is desirable for the output illumination beam 172 to be a converging light beam at the place where it impinges upon the spatial light modulator 150, as suggested by light ray 144. It is also often desirable for the output illumination beam 172 to be relatively uniform in brightness over the active area of the spatial light modulator 150. Furthermore, it is often desirable to accomplish this illumination in a package that is physically small, and that uses high efficiency, high brightness light sources in order to keep heat generation low and device size small. A logical option for high efficiency, high brightness sources is one or more discrete, solid state light sources such as light emitting diodes (LEDs). However, other suitable light sources can also be used.

In this regard, "light emitting diode" or "LED" refers to a diode that emits light, whether visible, ultraviolet, or infrared, although in most practical embodiments the emitted light will have a peak wavelength in the visible spectrum, e.g. from about 400 to 700 nm. The term LED includes incoherent encased or encapsulated semiconductor devices marketed as "LEDs", whether of the conventional or super radiant variety, as well as coherent semiconductor devices such as laser diodes, including but not limited to vertical cavity surface emitting lasers (VCSELs). An "LED die" is an LED in its most basic form, i.e., in the form of an individual component or chip made by semiconductor processing procedures. For example, the LED die may be formed from a combination of one or more Group III elements and of one or more Group V elements (III-V semiconductor). The component or chip can include electrical contacts suitable for application of power to energize the device. Examples include wire bonding, tape automated bonding (TAB), or flip-chip bonding. The individual layers and other functional elements of the component or chip are typically formed on the wafer scale, and the finished wafer can then be diced into individual piece parts to yield a multiplicity of LED dies. The LED die may be configured for surface mount, chip-on-board, or other known mounting configurations. Some packaged LEDs are made by forming a polymer encapsulant over an LED die and an associated reflector cup. Some packaged LEDs also include one or more phosphor materials that are excited by an ultraviolet or short wavelength visible LED die, and fluoresce at one or more wavelengths in the visible spectrum. An "LED" for purposes of this application should also be considered to include organic light emitting diodes, commonly referred to as OLEDs.

At the heart of the illuminator 140 is a light source 120, which may include one or more LEDs, including in some cases one or more laser diodes. Several such LEDs can be combined to produce a desired spectral distribution of light. For example, the outputs of red-, green-, and blue-emitting LEDs may be combined to provide nominally white light, or white-emitting LEDs may be used instead or additionally. Alternatively, one or more LEDs of a specific non-white color may be used to produce colored (non-white) illumination, e.g., red, or green, or blue illumination, in which case the projected image will be monochrome rather than full color. In the schematic drawing of FIG. 1, the light source 120 is drawn as a single LED die 122 disposed behind a polarizer 124. The light source 120 is assumed to emit white light, as in the case where the LED die emits blue or UV light and is covered with a thin coating (not shown) of a yellow- or white-emitting phosphor. The polarizer 124, which may be any suitable polarizer including an absorbing linear polarizer, a multilayer polymeric reflective polarizer, or a laminate of a reflective polarizer and an absorbing polarizer, predominantly transmits only one polarization state of light, causing the light emitted by the source 120 to be polarized. In alternative embodiments, a light guide, lens, or color combiner may be inserted between the LED die 122 and the polarizer 124 to allow the LED die (or other active light source, if desired) to be mounted remotely from the polarizer. In other alternative embodiments, the polarizer 124 may be omitted, such that the light emitted by the source 120 is unpolarized. In still other cases, the polarizer 124 may be retained and a retarder film, such as a quarter wave retarder, may be added atop the polarizer 124 such that the source 120 emits rotationally polarized (circularly or elliptically polarized) light. However, in the particular embodiment shown in FIG. 1, the light source 120 emits polarized light because the polarizer 124 is included in front of the LED die 122. The arrow 170 schematically represents an input light beam emitted by the light source 120 into a reflective cavity, which is also part of the illuminator 140 and is discussed further below. The input light beam 170 is assumed to comprise broad band (and polarized) white light, and is assumed to cover a distribution of propagation directions, e.g. in a Gaussian distribution of angles centered about the optical axis 142. For illustrative purposes, a representative light ray 144 is shown originating from the light source 120 and propagating through the projector 110. A first ray portion 144*a* is part of the input light beam 170, and it is shown to have a polarization state P1 as a result of the polarizer 124.

The input light beam 170 is emitted into a reflective cavity 130 formed by a reflective polarizer 134 and a reflector 132. The reflector 132 has a high specular reflectivity (for example, in some cases at least 70%, or at least 80%, or at least 90%, or at least 95%) for light within the spectral range of the input light beam 170, and for all polarization states, and in some cases it also substantially preserves the degree of the polarization of an incident light ray in the reflected ray. Any known structure or material that can supply these characteristics can be used. Metal coatings, optically enhanced metal coatings, multilayer interference structures or films, whether stacks of alternating inorganic materials, or stacks of coextruded polymers appropriately oriented or processed to provide a high reflectivity over a range of angles and over the spectral range of interest and for all polarizations, may be used for this purpose. See for example U.S. Pat. No. 5,882,774 (Jonza et al.). Alternatively, a simple metal coating such as a layer of aluminum or a layer of silver may in some cases be used for the reflector 132. The reflective polarizer 134 provides a high reflectivity (for example, in some cases at least 70%, or at least 80%, or at least 90%) for one polarization state of light within the spectral range of interest, while also providing a low reflectivity (for example, in some cases less than 30%, or less than 20%, or less than 10%) and corresponding high transmission for light of an orthogonal polarization state in such spectral range. Any known structure or material that can supply these characteristics can be used. A wire grid polarizer, cholesteric reflective polarizer, or multilayer polymeric reflective polarizing film (comprising an interference stack of coextruded polymers appropriately oriented or processed to provide a high reflectivity for one polarization state and low reflectivity for an orthogonal polarization state) may be used for the reflective polarizer 134. As a specific example, Advanced Polarizer Film (APF) available from 3M Company, St. Paul, MN may be used for the reflective polarizer 134. Given an appropriate reflector 132 and reflective polarizer 134, light of one polarization state can reflect back and forth within the reflective cavity 130 as illustrated by the light ray 144. In the embodiment illustrated, the reflective polarizer 134 is oriented to provide high reflectivity for light of the first polarization state P1, and thus it will provide low reflectivity and high transmission for light of an orthogonal second polarization state P2.

In order for the polarized light emitted by the light source 120 to emerge from the illuminator 140, the polarization state should be rotated from the first polarization state P1 (which is highly reflected by the reflective polarizer 134) to the orthogonal second polarization state P2 (which is highly transmitted by the reflective polarizer 134). To accomplish this rotation, we include a retarder film 136 in the reflective cavity 130. The retarder film 136 may be located near, and may be substantially coextensive with, the reflector 132 as shown in the figure, but the retarder film 136 may alternatively be located elsewhere in the reflective cavity 130. The amount of retardation provided by the retarder film 136 is selected to provide the desired rotation of the polarization state based on the number of passes of a representative light ray through the retarder film. In the depicted embodiment, light passes through the retarder film two times, which would lead one to select a (single-pass) retardance of a quarter-wave of light for the retarder film 136. Thus, in reference to the light ray 144, upon reflection at the reflective polarizer 134, the first polarization state P1 is maintained in the reflected ray portion 144*b*. This ray portion 144*b* passes through the retarder film 136, and is reflected at the reflector 132. The resulting reflected ray portion 144*c* passes again through the retarder film 136, after which it acquires the second polarization state P2 (orthogonal to the state P1) as a result of the two passes through the retarder film. This ray portion 144*c* is thus highly transmitted by the reflective polarizer 134 and emerges from the illuminator 140 as ray portion 144*d*, still having the second polarization state P2. The ray portion 144*c* is one of the many light rays that make up the output illumination beam 172 discussed above.

The reflector 132 and the reflective polarizer 134 may have the same or similar lateral dimensions, e.g., parallel to the x-axis, or parallel to the y-axis, or along a diagonal of the spatial light modulator 150. Furthermore, the reflector 132 and reflective polarizer 134 may be shaped to have convex or concave curvatures as appropriate to focus the light from the light source to produce an output illumination beam 172 that is converging at the place where such beam impinges on the spatial light modulator 150. One example of such curvatures is illustrated in FIG. 1. The curvatures may be simple spherical curvatures, or they may be aspherical. The curvatures may also in some cases be anamorphic, i.e., more highly or strongly curved in one plane (e.g. the y-z plane) than in an orthogonal plane (e.g. the x-z plane). In other cases the curvatures may be rotationally symmetric about the optical axis 142.

In order for light from the light source 120 to enter the reflective cavity 130, an aperture 138 is provided in the reflector 132. Note, however, that a light ray within the input light beam 170 that travels parallel to the optical axis 142 (as well as light rays within a narrow angular cone centered about the optical axis 142) will be reflected by the reflective polarizer 134 but then will not be reflected by the reflector 132 due to the absence of the reflector 132 in the region of the aperture 138, and such light therefore also will not become part of the output illumination beam 172. This may give rise to a darkened area in the vicinity of the optical axis 142 in the output illumination beam 172, at the position of the spatial light modulator 150, such darkened area roughly analogous to a shadow of the aperture 138. To reduce this shadowing effect, it is helpful to make the aperture 138, as well as the light source 120, as small as possible.

One or more scattering elements may also be included in the illuminator 140 to help further reduce the shadowing effect and make the output illumination beam 172 more spatially uniform. One example of such a scattering element is a grooved, textured, or otherwise roughened surface included as part of the reflective cavity 130. To the extent the reflective cavity 130 makes uses of lenses or other optical bodies to which the various reflectors or films are applied, such optical bodies may be made by single point diamond turning, where the tooling pattern creates a series of grooves that scatter a fraction of the incident light toward the optical axis 142. Another example of a scattering element is a layer of scattering material that is disposed within the reflective cavity 130. Such a layer may for example be or comprise a microparticle filled adhesive layer of film, and/or a microstructured surface coated with a layer of a different refractive index. Regardless of which type of scattering element is used, it or they should substantially preserve the polarization state of light so as not to detract from the operation of the illuminator as already described. In some cases, the scattering element(s) may provide a spatially uniform scattering, i.e., a scattering that is the same as a function of the radial distance from the optical axis 142. In other cases, the scattering element(s) may be designed to provide a spatially non-uniform scattering, e.g., a maximum amount of scattering at or near the optical axis 142, and reduced scattering at increased radial distances from the optical axis 142.

By inspection of FIG. 1, one can see that it is important to preserve the polarization state of light propagating within the reflective cavity 130—except, of course, for the deliberate change in polarization caused by the retarder film 136. If a lens or other optical body substantially filled the space between the reflector 132 and the reflective polarizer 134, and if such optical body was made of a material that had a residual optical birefringence, such residual birefringence could change the polarization state of a given light ray as it traversed the reflective cavity 130, such that, for example, the ray portion 144a was not substantially reflected at the reflective polarizer 134, or the ray portion 144c was not substantially transmitted at the reflective polarizer 134. For this reason, it is desirable to substantially fill the volume of the reflective cavity 130 with a material or medium having little or no birefringence so that proper operation of the illuminator 140 can be maintained. In one class of examples, referred to herein as "solid cavity", a majority of the cavity volume, and in some cases substantially the entire cavity volume, comprises one or more solid light-transmissive materials having very low birefringence, such as PMMA, cyclic polyolefins, inorganic glass, or silicones. In another class of examples, referred to herein as "hollow cavity", a majority of the cavity volume, and in some cases substantially the entire cavity volume, comprises air or vacuum. Some advantages of the hollow cavity approach include no measurable birefringence, reduced weight, and improved masking of the shadowing effect, as discussed further below.

In the embodiment of FIG. 1, the aperture 138 is provided not only in the reflector 132 but also in the retarder film 136. Because of this, as the light ray 144 travels from the light source 120 to the spatial light modulator 150, it passes through the retarder film 136 exactly two times. In an alternative embodiment, the aperture in the retarder film 136 could be omitted, such that the retarder film 136 was intact and continuous, with no central hole. In that case, the light ray 144 would pass through the retarder film 136 once in the ray portion 144a, and once again in the ray portion 144b and again in the ray portion 144c, for a total of three passes through the retarder film 136. The performance of such an embodiment may not be optimal but may be adequate for some applications. The single pass retardation of the retarder film 136 in such embodiments would be selected to provide the desired rotation of the polarization state based on three passes of a representative light ray through the retarder film, which would give a result somewhat less than a quarter-wave of light.

Figure 2:
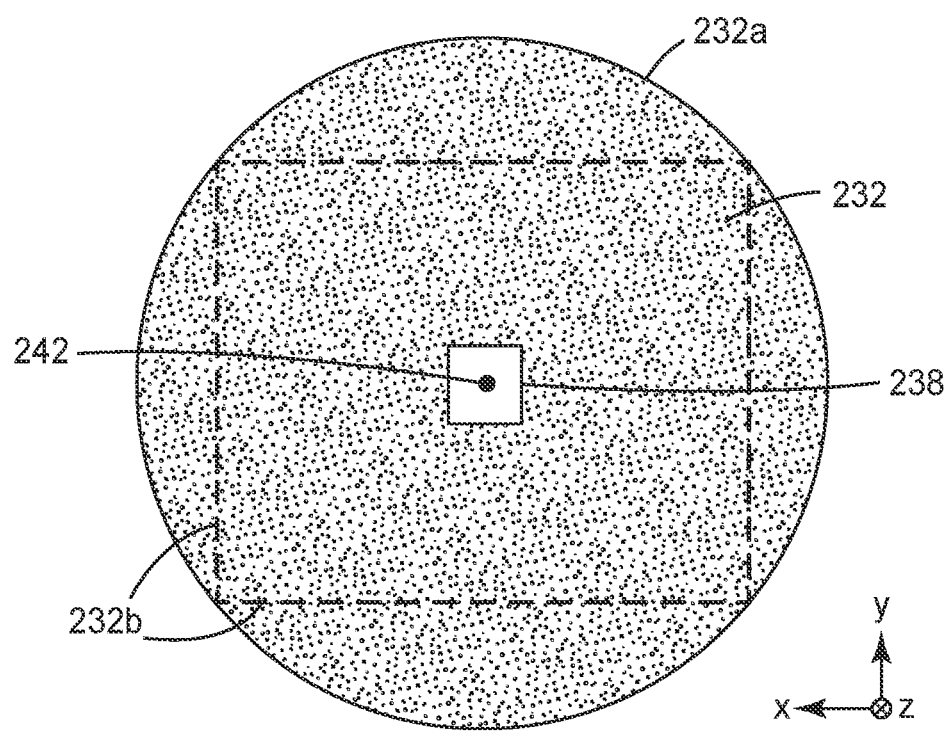
FIG. 2 is a schematic front view of a reflector used in the projection system of FIG. 1.

FIG. 2 is taken from a different perspective to illustrate possible outer boundaries or shapes of the reflective cavity 130 and its constituent parts. In particular, FIG. 2 is a front view of a reflector 232 which may be the same as or similar to reflector 132, the reflector 232 being a part of a projector that may be the same as or similar to the projector 110 already described. An aperture 238 is provided in the reflector 232, the aperture 238 likewise being the same as or similar to the aperture 138 in FIG. 1. From the perspective of FIG. 2, the entire aperture can clearly be seen. The aperture 238 is typically but not necessarily centered on an optical axis 242 of the reflective cavity. In some cases, the reflector 232 may have a round (circular) outer boundary or edge 232a as would be typical for a conventional round lens. In other cases, the projector size and weight may be decreased by truncating the reflector 232 to have a reduced boundary or edge 232b. The boundary 232b drawn in FIG. 2 is a rectangle whose aspect ratio is about 5:4. This 5:4 aspect ratio is intended to substantially match the aspect ratio of the active area of the spatial light modulator 150 for efficient matching of the illumination optics to the spatial light modulator, although the actual length and width dimensions of the reflector 232 may be somewhat larger than those of the spatial light modulator. Note that although only the reflector 232 is depicted in FIG. 2, the other chief components of the reflective cavity 130, such as the reflective polarizer 134 and the retarder film 136, may be provided with boundaries or edges that match or substantially match that of the reflector 232, e.g., edge 232a or edge 232b.

Figure 3:
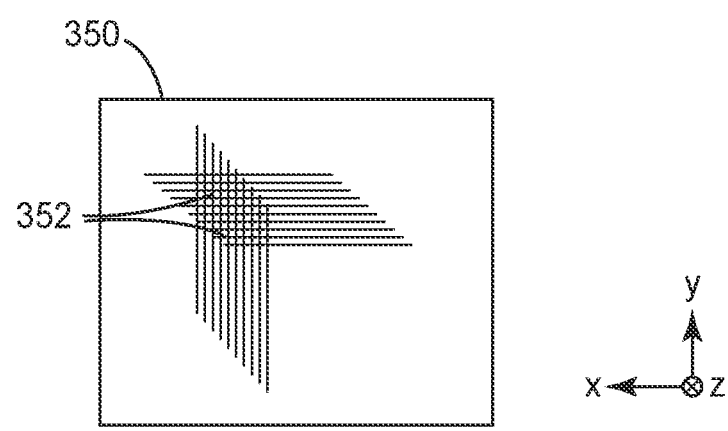
FIG. 3 is a schematic front view of a spatial light modulator used in the projection system of FIG. 1.

FIG. 3 schematically illustrates a front view of a spatial light modulator 350, which may be the same as or similar to the spatial light modulator 150 in FIG. 1. Alternatively, the spatial light modulator 350 may represent a reflective-type spatial light modulator, as discussed in some of the embodiments below. The active area of the modulator 350 is filled with rows and columns of individual pixel elements 352, only some of the rows and columns being shown in FIG. 3 for simplicity. The length and width of the active area is typically substantially rectangular, and the rectangle often has a length-to-width aspect ratio of 5:4. Of course, other aspect ratios may be used, but it is sometimes desirable to match the relative shape (e.g. as characterized by an aspect ratio) of the illumination optics to that of the spatial light modulator. An electronic controller couples to the spatial light modulator 350 and controls the states of all of the individual pixels, as explained above. The spatial light modulator 350 may be configured such that the difference between "on" pixels and "off" pixels is given by a rotation in the polarization of the outgoing light ray, and/or an angular deflection of the outgoing light ray.

Figure 4:
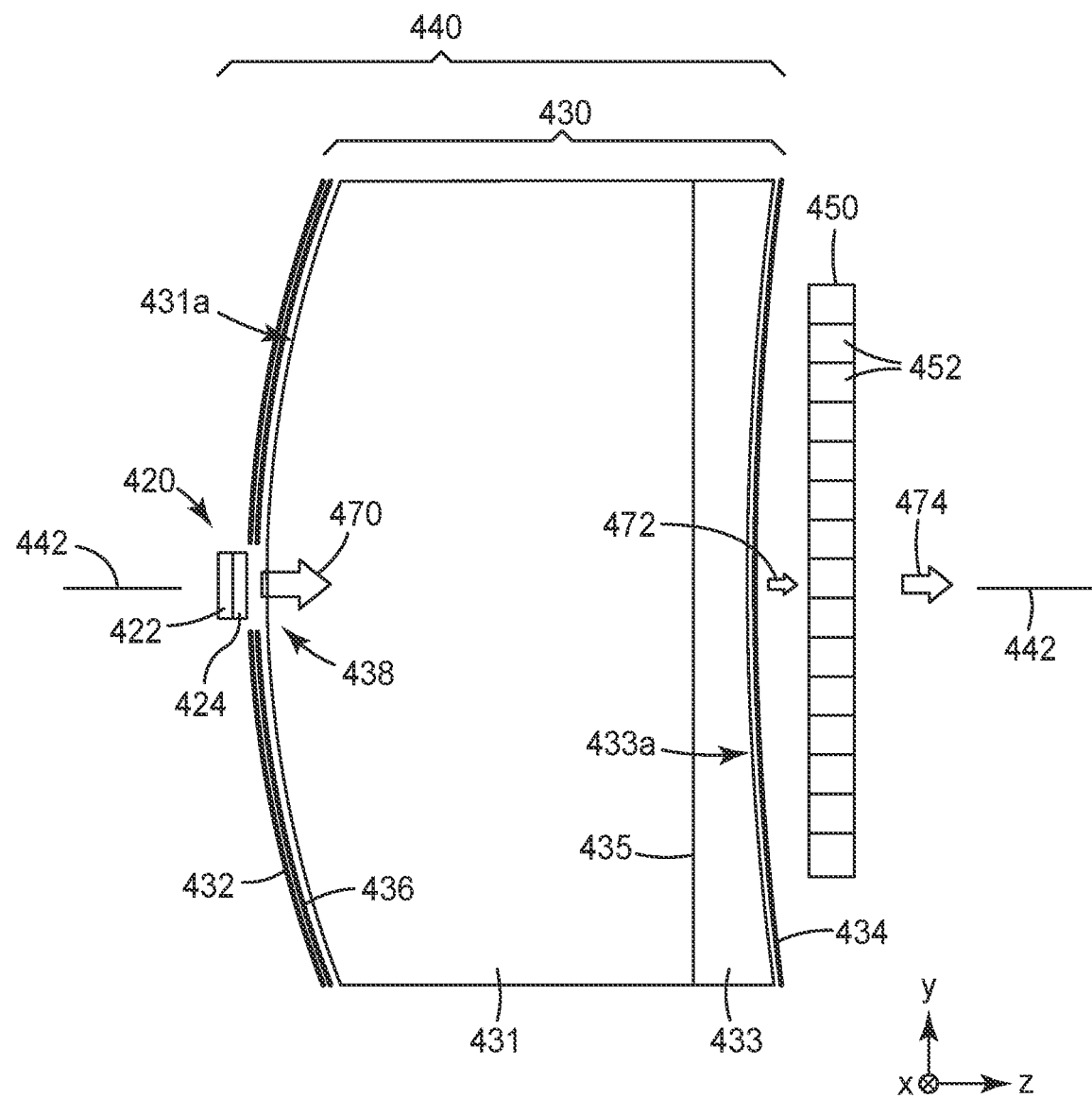
FIG. 4 is a schematic side view of a portion of a compact projection system, wherein the compact illuminator comprises a "solid cavity" type reflective cavity.

FIG. 4 illustrates a portion of a compact projection system including a compact illuminator, the illuminator comprising a "solid cavity" type reflective cavity as explained above. Thus, in FIG. 4, an illuminator 440 includes a light source 420 and a reflective cavity 430. The light source 420 includes an LED die 422 and a polarizer 424, but the light source 420 may alternatively be or comprise any of the variations discussed above with regard to light source 120.

The illuminator 440 and light source 420, as well as a spatial light modulator 450 (having pixel elements 452), are arranged along an optical axis 442. The light source injects an input light beam 470 into the reflective cavity 430, which is defined by a reflective polarizer 434 and a reflector 432. Disposed within the reflective cavity is a retarder film 436. The retarder film 436 is located adjacent the reflector 432, and an aperture 438 is provided in both the reflector and the retarder film. Light from the polarized light source 420 exits the reflective cavity 430 as output illumination beam 472, which illuminates the active area of the spatial light modulator 450. The spatial light modulator 450 converts the beam 472 into a transmitted patterned light beam 474, the beam 474 containing image-wise or spatially patterned information. All of the foregoing elements of the embodiment of FIG. 4 may be the same as or similar to the corresponding elements discussed above in connection with FIG. 1, and the embodiment of FIG. 4 may be used in a projector the same as or similar to that of FIG. 1. Similarly, the manner in which polarized light from the light source 420 reflects back and forth within the cavity 430, and its polarization rotated to allow it to emerge as output illumination beam 472, is the same as or similar to the operation of the illuminator 140, and need not be repeated here.

However, the particular construction of the reflective cavity 430 is worthy of some additional observations. The space between the reflector 432 and the reflective polarizer 434 defines a cavity volume, and substantially all of that cavity volume is occupied by one or more solid light-transmissive materials, in particular, a first optical lens or body 431 and a second optical lens or body 433. The bodies 431, 433 are cemented together along an interface 435 with a suitable optical adhesive or other optical bonding material. For ease of manufacture the interface 435 may be planar. The bodies 431, 433 are composed of suitable very low birefringence optical materials as discussed in more detail above, and they may be composed of different such optical materials or the same optical material. In an alternative embodiment the two optical bodies 431, 433 may be replaced with a single unitary optical body without any interface 435 therein but having the same outer surfaces. The optical body 431 has an outer curved surface 431a to which the retarder film 436 is applied directly or by a suitable optical bonding material. The reflector 432 is applied atop the retarder film so that the retarder film is properly positioned between the reflector 432 and the reflective polarizer 434. The reflective polarizer 434, in turn, is applied to an outer curved surface 433a of the optical body 433. Central portions of the reflector 432 and the retarder film 436 are etched, cut, or otherwise omitted to define the aperture 438, which is appropriately sized to the light source 420. At the aperture 438, the outer surface 431a of the optical body 431 may be exposed.

Figure 5:
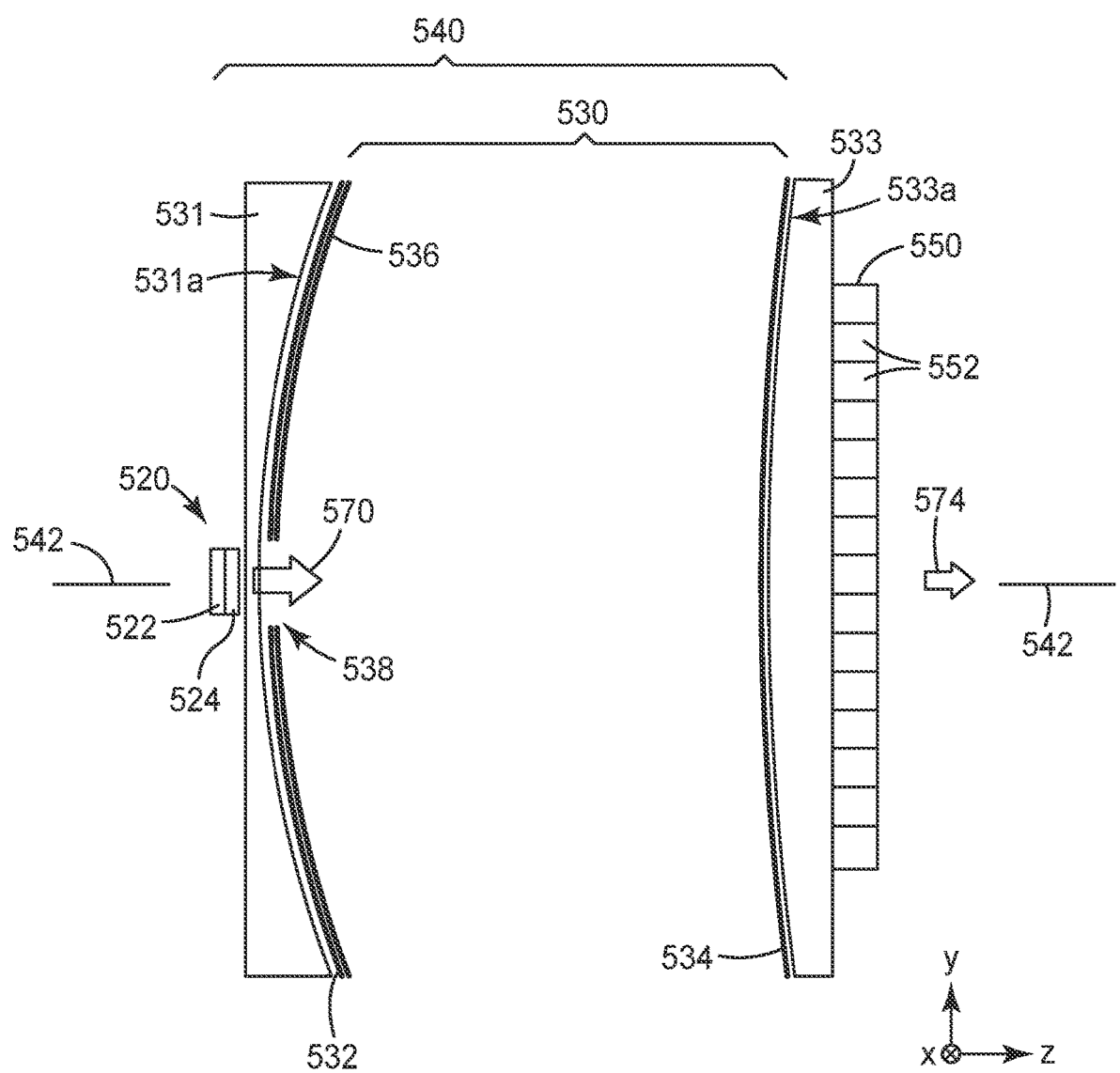
FIG. 5 is a schematic side view of a portion of a compact projection system, wherein the compact illuminator comprises a "hollow cavity" type reflective cavity.

FIG. 5 illustrates a portion of a compact projection system similar to FIG. 4, but for the opposite case in which the illuminator comprises a hollow cavity type reflective cavity rather than a solid cavity. Thus, in FIG. 5, an illuminator 540 includes a light source 520 and a reflective cavity 530. The light source 520 includes an LED die 522 and a polarizer 524, but the light source 520 may alternatively be or comprise any of the variations discussed above with regard to light source 120. The illuminator 540 and light source 520, as well as a spatial light modulator 550 (having pixel elements 552), are arranged along an optical axis 542. The light source injects an input light beam 570 into the reflective cavity 530, which is defined by a reflective polarizer 534 and a reflector 532. Disposed within the reflective cavity is a retarder film 536. The retarder film 536 is located adjacent the reflector 532, and an aperture 538 is provided in both the reflector and the retarder film. Light from the polarized light source 520 exits the reflective cavity 530 as output illumination beam, which illuminates the active area of the spatial light modulator 550. The spatial light modulator 550 converts the illumination beam into a transmitted patterned light beam 574, the beam 574 containing image-wise or spatially patterned information. All of the foregoing elements of the embodiment of FIG. 5 may be the same as or similar to the corresponding elements discussed above in connection with FIG. 1, and the embodiment of FIG. 5 may be used in a projector the same as or similar to that of FIG. 1. Similarly, the manner in which polarized light from the light source 520 reflects back and forth within the cavity 530, and its polarization rotated to allow it to emerge as an output illumination beam, is the same as or similar to the operation of the illuminator 140, and need not be repeated here.

However, the particular construction of the reflective cavity 530 is worthy of some additional observations. The space between the reflector 532 and the reflective polarizer 534 defines a cavity volume, and substantially all of that cavity volume is occupied by air, or vacuum, rather than any solid light-transmissive materials. This is made possible by supporting the opposed reflectors and retarder film on the inward-facing major surfaces of two optical bodies that are spaced apart from each other. In particular, a first optical lens or body 531 has a curved major surface 531a that faces a second optical lens or body 533, and the second body 533 has a curved major surface 533a that faces the first body 531. The bodies 531, 533 may be held firmly and stably in their relative positions by a suitable substrate or framework attached to the outer edges of the bodies. The bodies 531, 533 may be composed of suitably transparent optical materials to allow light from the light source 520 to pass through the body 531, and light exiting the reflective cavity 530 to pass through the body 533. The bodies 531, 533 may also be composed of relatively low birefringence optical materials so that the polarization state of light passing through the body 531, as well as the polarization state of light passing through the body 533, is not significantly rotated. But the amount of birefringence that can be tolerated in the bodies 531, 533 is substantially greater than that of bodies 431, 433, due to the substantially shorter optical path lengths for light rays passing through the bodies 531, 533 than for light rays passing through bodies 431, 433. This is a result of being able to design the bodies 531, 533 to have thicknesses (the dimension measured along the z-axis) that are substantially less than the on-axis thickness of the reflective cavity 530. The optical body 531 has an inner curved surface 531a to which the reflector 532 is applied directly or by a suitable optical bonding material. The retarder film 536 is applied atop the retarder film so that the retarder film is properly positioned between the reflector 532 and the reflective polarizer 534 when the optical bodies 531, 533 are properly mounted. The reflective polarizer 534, in turn, is applied to an inner curved surface 533a of the optical body 533. Central portions of the reflector 532 and the retarder film 536 are etched, cut, or otherwise omitted to define the aperture 538, which is appropriately sized to the light source 520. At the aperture 538, the inner surface 531a of the optical body 531 may be exposed.

Figure 10A:
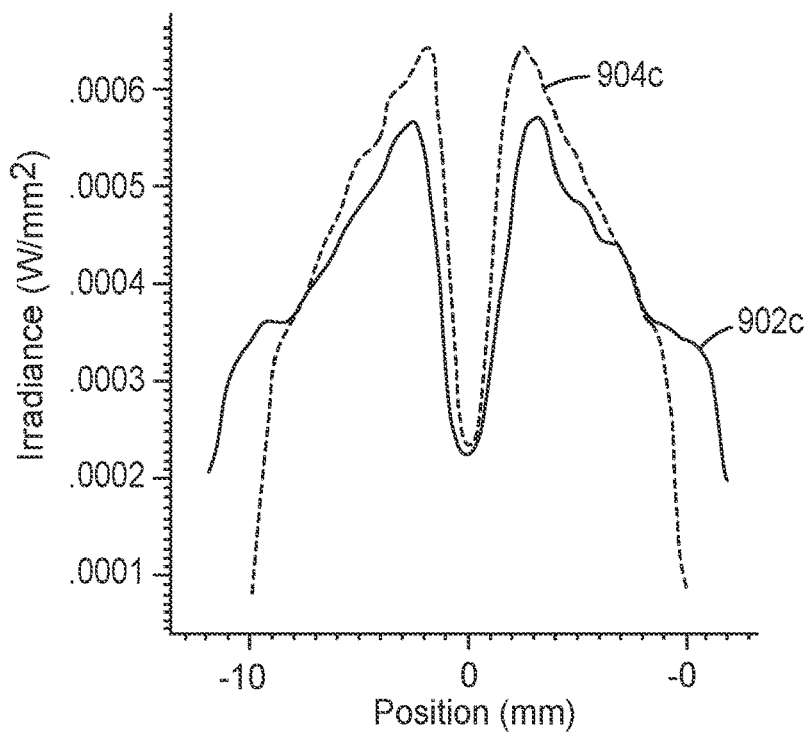
FIG. 10A is a duplicate of FIG. 9C.
Figure 10B:
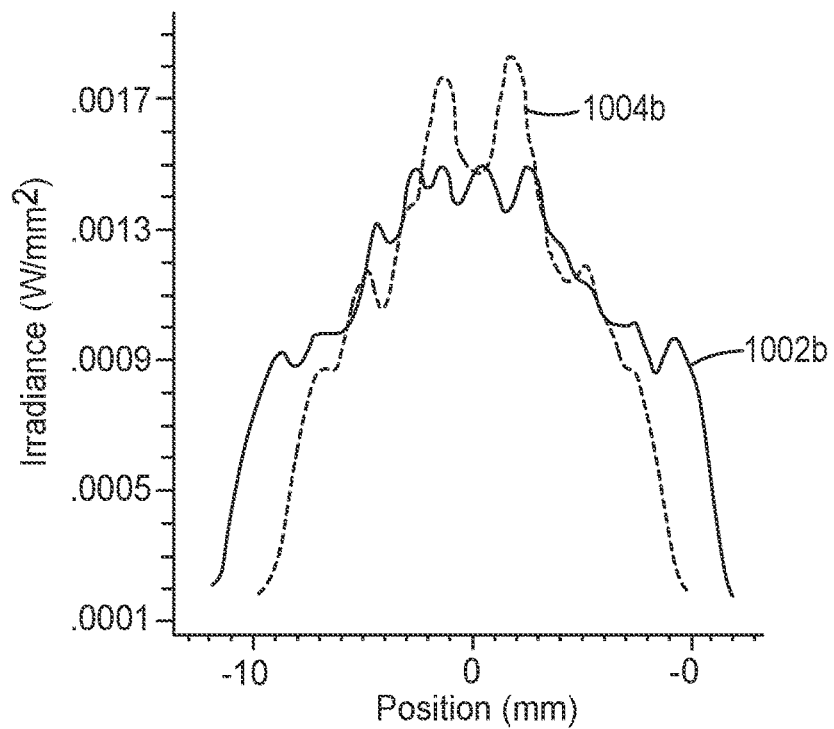
FIG. 10B is a graph similar to that of FIG. 9A, but where the reflective cavity utilizes a hollow cavity, and the surface roughness provides a Gaussian scattering angle of 1 degree.

Some advantages of hollow cavity-type illuminators may include one or more of: reduced weight; no measurable birefringence in the reflective cavity, including no birefringence resulting from thermally induced stress, as may occur in a solid optical body; the curved surfaces 531a, 533a can be formed in thin substrates by microreplication, reducing stray birefringence concerns and reducing any absorptive losses; and improved masking of the shadowing effect, i.e., improved spatial uniformity of the output illumination beam, as demonstrated below in connection with FIGS. 10A and 10B.

Figure 6A:
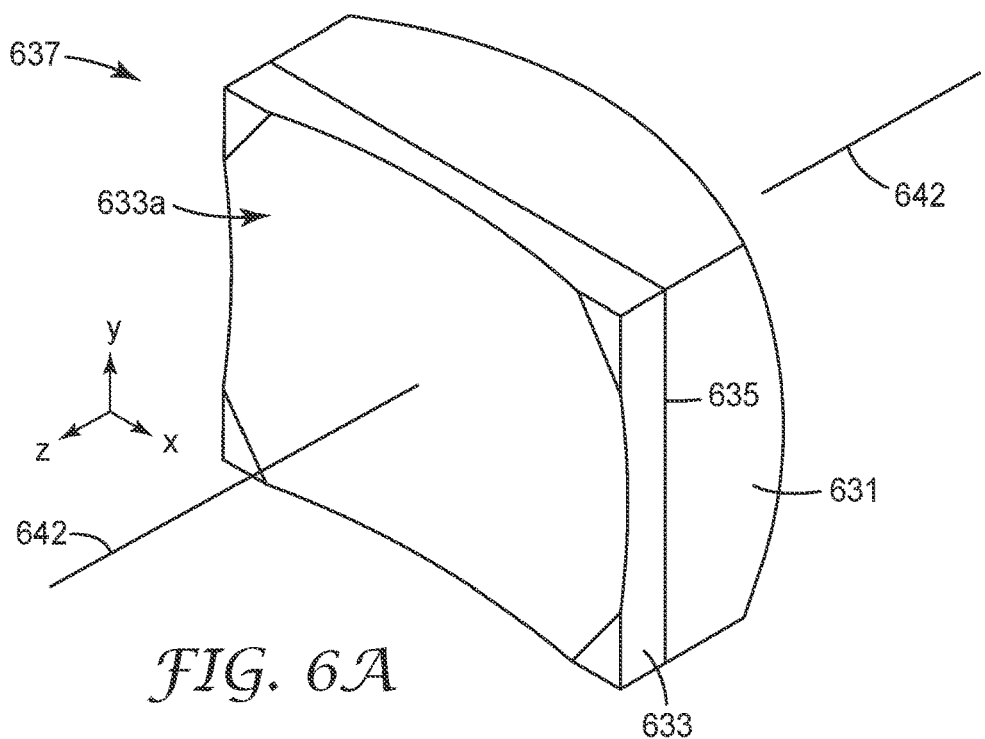
FIG. 6A is a schematic perspective view of an optical body for use as a reflective cavity of a compact illuminator.
Figures 6B, 6C:
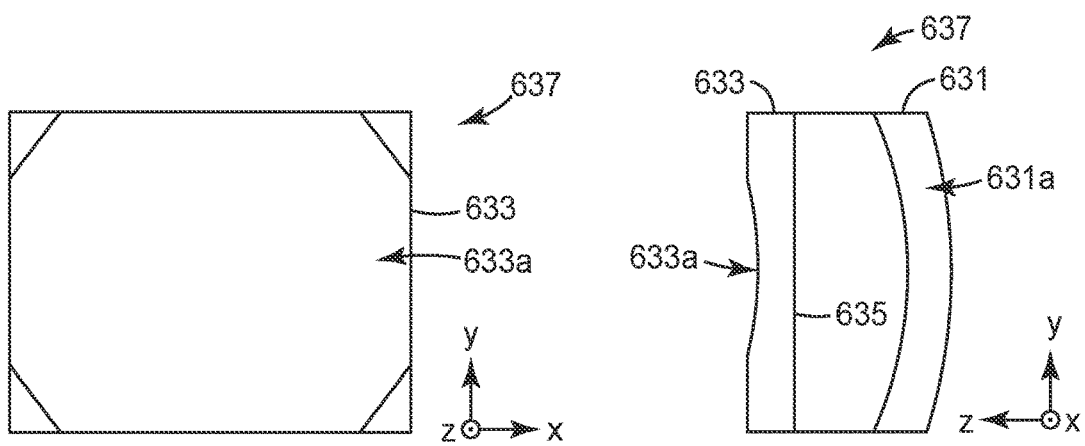
FIGS. 6B, 6C, and 6D are schematic rear, side, and top views of the optical body.
Figure 6D:
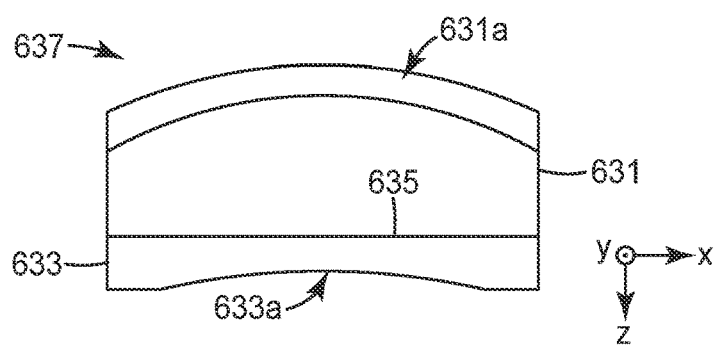

FIGS. 6A through 6D illustrate various views of a particular optical body 637 that has been found to be useful in at least some of the disclosed compact illuminators and projectors. FIG. 6A is a perspective view, FIG. 6B is a rear view, FIG. 6C is a side view, and FIG. 6D is a top view of the optical body 637. The FIGS. 6A-6D are at least approximately to scale with regard to relative lengths, widths, and thicknesses of the various illustrated features. The optical body 637 is composed of a first optical body 631 attached to a second optical body 633 along a planar interface 635. The bodies 631, 633 are analogous to the optical bodies 432, 433 of FIG. 4, and those optical bodies of FIG. 4 can be designed precisely as set forth here in connection with the optical body 637.

The first and second optical bodies 631, 633 are assumed to be made of the same very low birefringence optical material, in particular, annealed PMMA, which has a refractive index of about 1.49 at a visible wavelength of 550 nm. The first optical body 631 has an outer major convex surface 631a and the second optical body 633 has an outer major concave surface 633a, and both of these surface curvatures are oriented along the same optical axis 642 of the optical body 637. These two surface curvatures are each also aspherical, but are rotationally symmetric about the optical axis 642 (ignoring the rectangular outer boundary or edge of the bodies 637, 631, 633).

The surface 631a has a radius of curvature of 11.156 mm, a conic constant of 0.11055, and the following polynomial aspheric coefficients:

$4^{th}$ order aspheric coefficient: 0.00012286;
$6^{th}$ order aspheric coefficient: −1.3845E-06; and
$8^{th}$ order aspheric coefficient: 5.2850E-08,
where exponential notation is used for numbers of very small magnitude. The aspheric coefficients and other information relating to the curvature of surfaces 631a (and 633a) is provided herein using the nomenclature of LightTools™ illumination design software.

The surface 633a has a paraxial radius of curvature of 58.562 mm, a conic constant of 29.052, and the following polynomial aspheric coefficients:

$4^{th}$ order aspheric coefficient: 2.2997E-05;
$6^{th}$ order aspheric coefficient: 1.2025E-05; and
$8^{th}$ order aspheric coefficient: 7.0933E-08.

The overall length (dimension along the x-axis) and width (dimension along the y-axis) of the optical body 637 and its component bodies 631, 633 is 9.2 millimeters and 7.4 millimeters, respectively. The 9.2 mm length and 7.4 mm width are substantially in the proportion of 5:4. The axial thickness of the optical body 637, i.e., the physical thickness (dimension along the z-axis) of the optical body 637 measured at the optical axis 642, is 4.38 millimeters.

The performance of a compact projection system utilizing the optical body 637, in an embodiment similar to that of FIG. 4, was modeled with commercial optical modeling software. Such modeling is discussed below in connection with FIGS. 8 and 9A through 9E.

Figure 7:
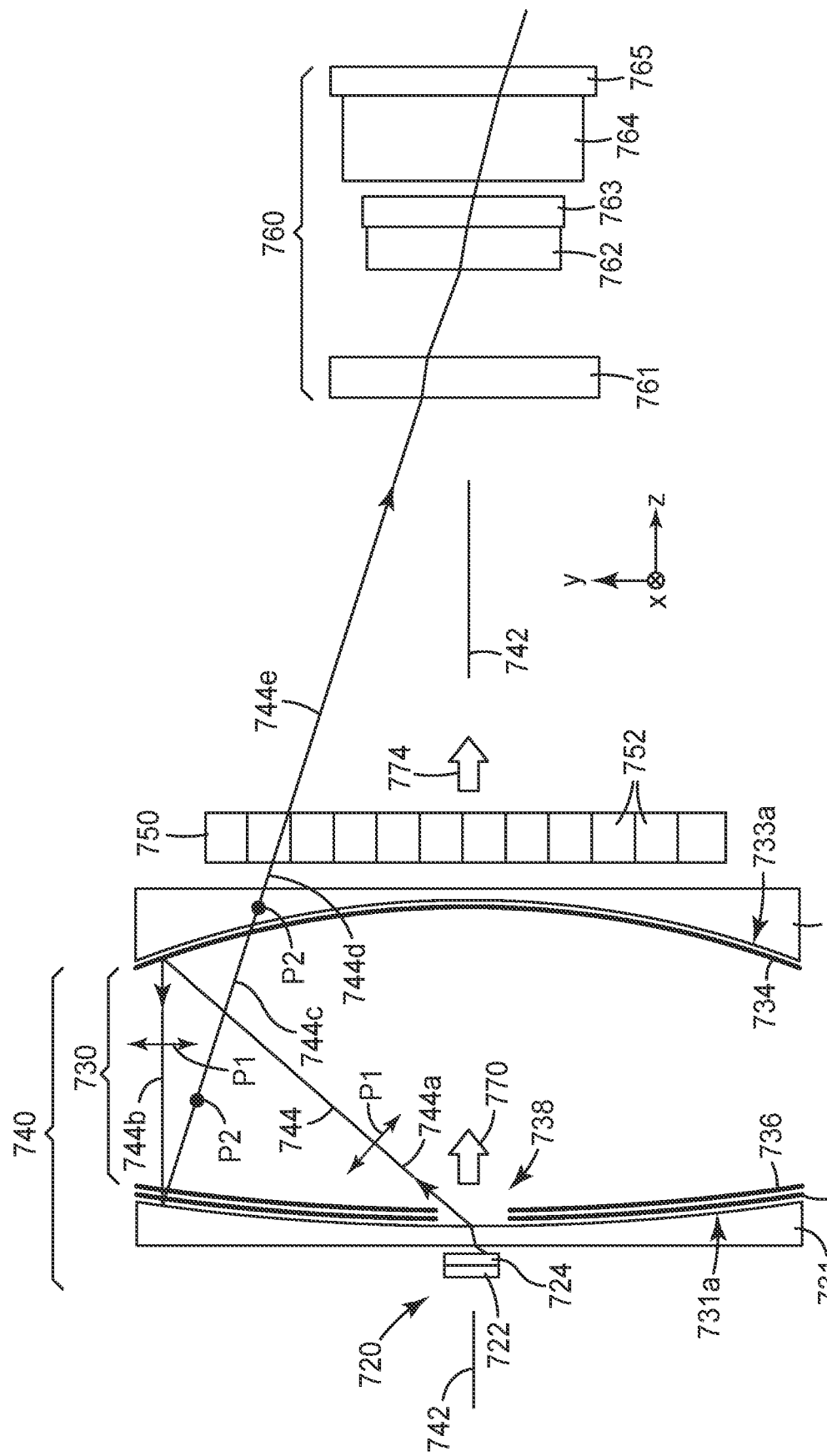
FIG. 7 is a schematic side view of another compact projection system.
Figure 8:
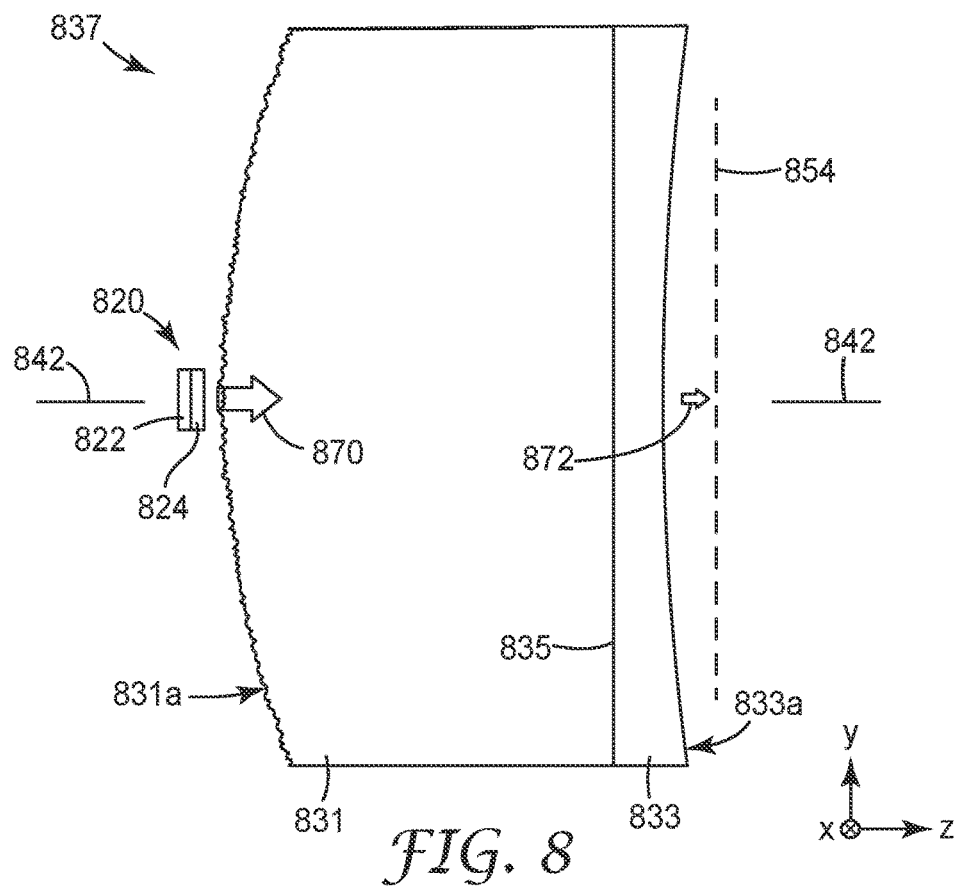
FIG. 8 is a schematic side view of an optical body for use as a reflective cavity of a compact illuminator, where one surface is roughened to promote light scattering and make the output illumination beam more spatially uniform.
Figure 9A:
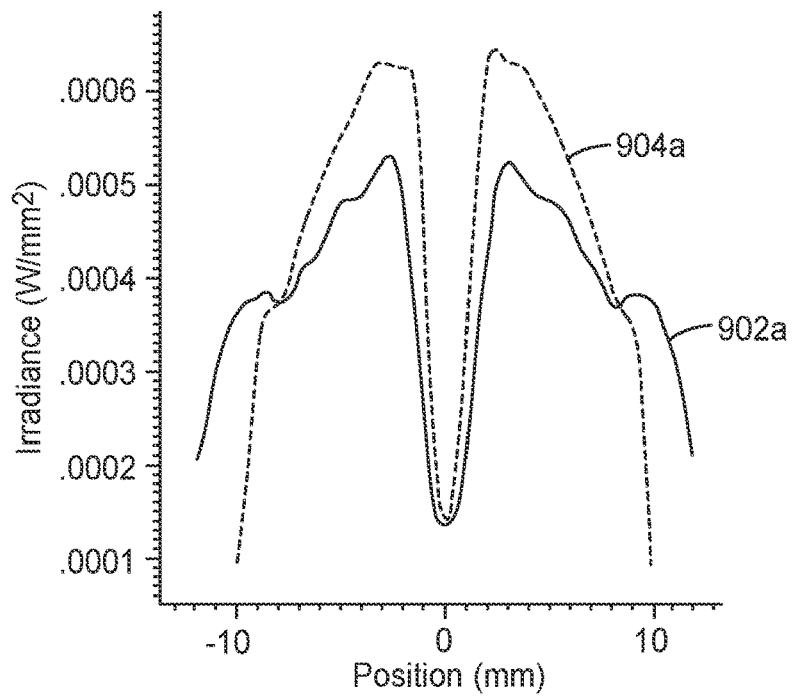
FIG. 9A is a graph of irradiance versus position at the output plane of the illumination beam, where the surface roughness provides a Gaussian scattering angle of 0.01 degrees.
Figure 9B:
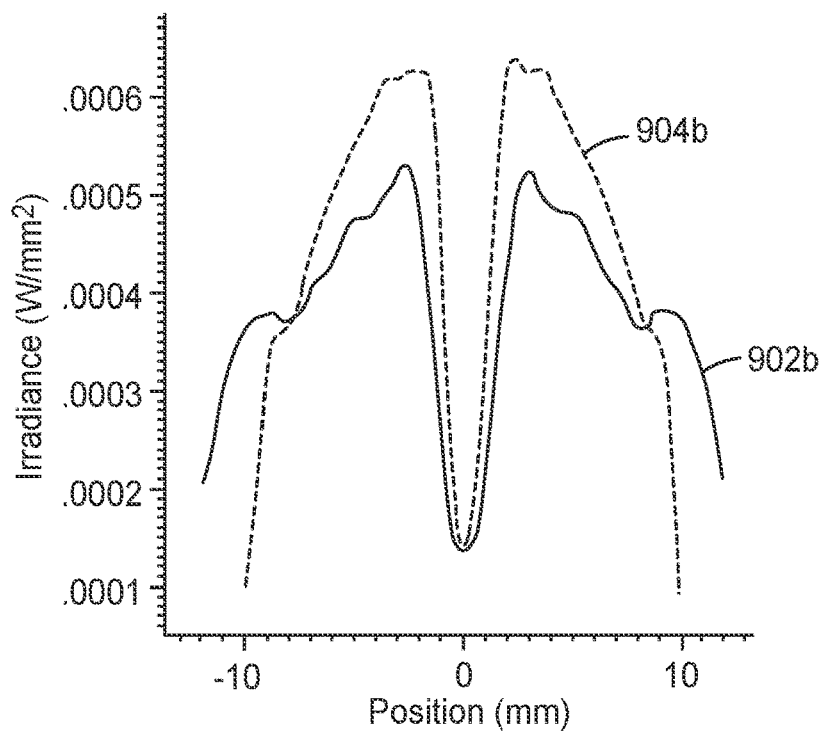
FIG. 9B is a graph similar to that of FIG. 9A, but where the surface roughness provides a Gaussian scattering angle of 0.1 degrees.
Figure 9C:
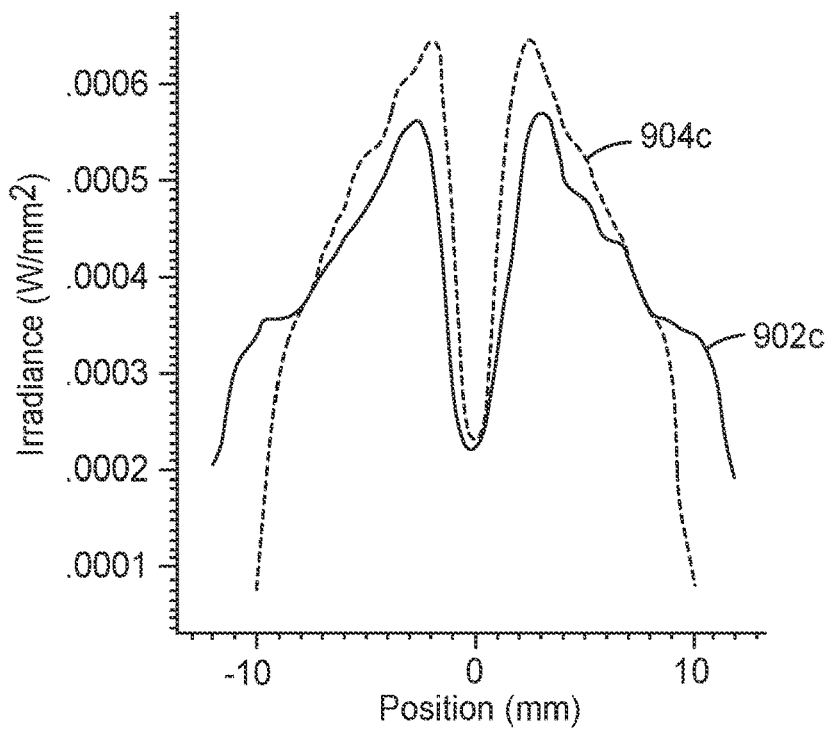
FIG. 9C is a graph similar to that of FIG. 9A, but where the surface roughness provides a Gaussian scattering angle of 1 degree.
Figure 9D:
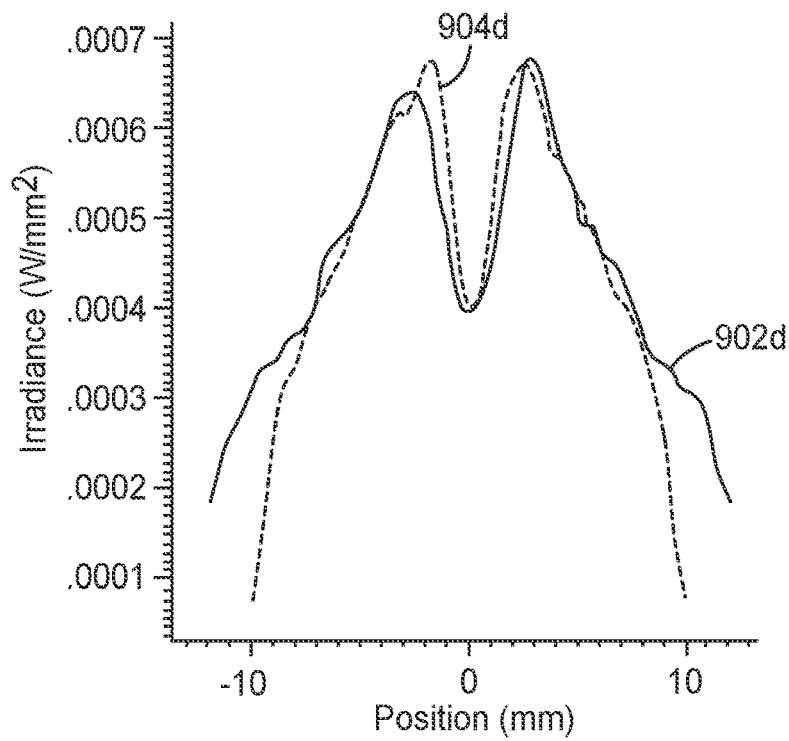
FIG. 9D is a graph similar to that of FIG. 9A, but where the surface roughness provides a Gaussian scattering angle of 2 degrees.
Figure 9E:
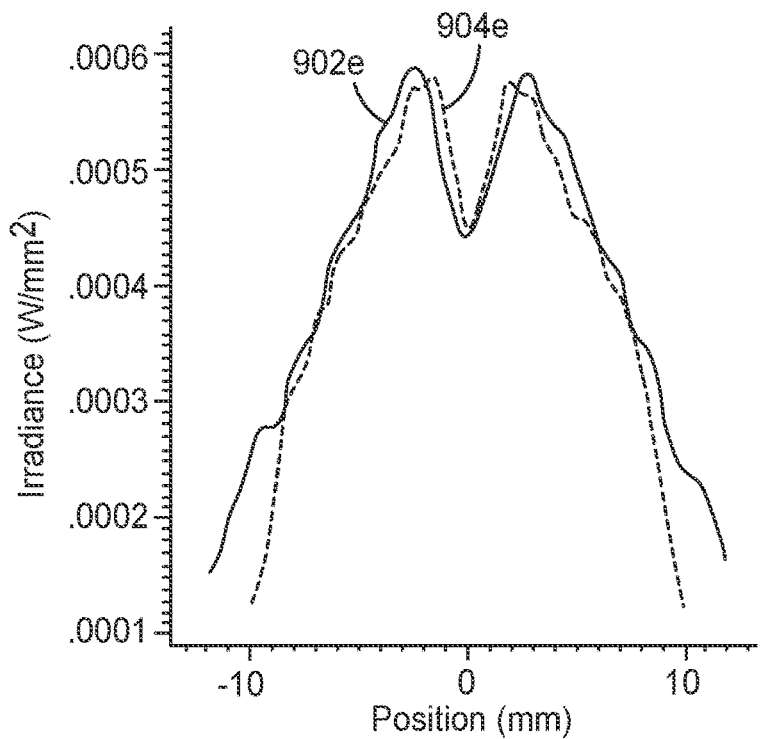
FIG. 9E is a graph similar to that of FIG. 9A, but where the surface roughness provides a Gaussian scattering angle of 4 degrees.

FIG. 7 is a schematic side view of another compact projection system, this one using an illuminator having a hollow cavity type of reflective cavity similar to FIG. 5. In FIG. 7, a projector includes a compact illuminator 740, a spatial light modulator 750 (having pixel elements 752), and a projector lens 760 (a lens module having individual lenses 761, 762, 763, 764, and 765). The illuminator 740 includes a light source 720 and a reflective cavity 730. The light source 720 includes an LED die 722 and a polarizer 724, but the light source 720 may alternatively be or comprise any of the variations discussed above with regard to light source 120. The illuminator 740 and light source 720, as well as the spatial light modulator 750 and the projector lens 760, are arranged along an optical axis 742. The light source injects an input light beam 770 into the reflective cavity 730, which is defined by a reflective polarizer 734 and a reflector 732. Disposed within the reflective cavity is a retarder film 736. The retarder film 736 is located adjacent the reflector 732, and an aperture 738 is provided in both the reflector and the retarder film. Light from the polarized light source 720 exits the reflective cavity 730 as output illumination beam, which illuminates the active area of the spatial light modulator 750. The spatial light modulator 750 converts the illumination beam into a transmitted patterned light beam 774, the beam 774 containing image-wise or spatially patterned information. All of the foregoing elements of the embodiment of FIG. 7 may be the same as or similar to the corresponding elements discussed above in connection with FIGS. 1 and 5. Similarly, the manner in which polarized light from the light source 720 reflects back and forth within the cavity 730, and its polarization rotated to allow it to emerge as an output illumination beam, is the same as or similar to the operation of the illuminator 140. In brief, referring to representative light ray 744: a first ray portion 744a, which is part of the input light beam 770, has a polarization state P1; a second ray portion 744b is generated by reflection from reflective polarizer 734; a third ray portion 744c is generated by reflection from reflector 732, and has a rotated second polarization state P2 due to two passes of the light ray through the retarder film 736; a fourth ray portion 744d, which is part of the output illumination beam, also has the second polarization state P2 and impinges upon the spatial light modulator 750; a fifth ray portion 744e, which is spatially modulated by the modulator 750 as a function of whether the particular pixel 752 through which the beam passes is in an "on" or "off" state. If we assume the ray portion 744e is passed by the modulator 750, it then goes on to be captured by the projector lens 760 and emitted to a remote surface or user.

Similar to the embodiment of FIG. 5, the projector and illuminator of FIG. 7 utilize a hollow cavity type reflective cavity 730. A first optical lens or body 731 has a curved major surface 731a that faces a second optical lens or body 733, and the second body 733 has a curved major surface 733a that faces the first body 731. These bodies 731, 733 are analogous to the optical bodies 531, 533 described above, except the curvatures of the respective major surfaces have been changed. Relative to the FIG. 5 embodiment, the curvature of the surface 731a has been reduced (greater radius of curvature), and the curvature of the surface 733a has been flipped from convex to concave. In this regard, there is substantial design flexibility in selecting the curvatures of the reflectors that form the reflective cavity in the disclosed embodiments (both hollow cavity types and solid cavity types), and even non-curved or planar shapes can be used. But in many cases it is nevertheless desirable to select a set of curvatures that will produce an illumination beam that is converging at the place where it impinges upon the spatial light modulator.

As mentioned above, the performance of a compact projection system utilizing the optical body 637 was modeled with commercial optical modeling software. One added feature that was investigated as part of the modeling was the addition of surface roughness on one of the curved outer surfaces of the optical body, as illustrated generally in FIG. 8, to introduce controlled amounts of light scattering. In that figure, an optical body 837 is composed of a first optical body 831 and a second optical body 833 joined together along a planar interface 835, and aligned along an optical axis 842. The first optical body 831 has an outer curved surface 831a, and the second optical body 833 has an outer curved surface 833a. For ease of illustration, a reflector, a reflective polarizer, and a retarder film are omitted from FIG. 8, but the reader will understand that such optical elements are applied to the surfaces 831a, 833a in the same fashion as they are applied to the respective curved surfaces 431a, 433a as described above, to form a reflective cavity using the optical body 837. Specifically, the retarder film and reflector (with suitable apertures) are applied to the curved surface 831a, and the reflective polarizer is applied to the curved surface 833a. A light source 820, having an LED die 822 and a polarizer 824, injects an input light beam 870 into the reflective cavity, and an output illumination beam 872 emerges from the other side of the reflective cavity to illuminate the spatial light modulator, represented schematically in FIG. 8 by reference number 854. Propagation of light back and forth within the reflective cavity is substantially as described in FIG. 1.

The optical modeling was able to create a controlled amount of surface roughness along the curved surface 831a, while otherwise maintaining the original nominal curvature of that surface. The same controlled surface roughness was also imputed to the reflector (see e.g. reflector 432 in FIG. 4), which was assumed to be applied to such surface. The modeling assumed the curvatures, thicknesses, and material properties discussed above for the optical body 637 of FIG. 6. The optical modeling also assumed:
- the reflector (refer again to reflector 432 in FIG. 4) had a reflectivity of 100% for all polarizations of light;
- the reflective polarizer (refer e.g. to reflective polarizer 434 in FIG. 4) had a 100% reflectivity for a first polarization state and 0% reflectivity (100% transmission) for an orthogonal second polarization state;
- the size of the aperture (refer e.g. to aperture 438 in FIG. 4) was 0.3 by 0.5 millimeters;
- a spatial light modulator having a 5:4 length-to-width aspect ratio and diagonal measuring 6.0 millimeters;
- a projector lens module that included five individual lenses arranged in series as shown in the following table, where lens 1 refers to the individual lens that is farthest from the spatial light modulator and lens 5 refers to the individual lens that is closest to the spatial light modulator, where a negative radius (R1, R2) denotes a concave curvature, a positive radius denotes a convex curvature, CT denotes center thickness, R1CH denotes R1 center height, and DIA denotes the lens diameter:

| 5-element Projector Lens Details | | | | | |
| --- | --- | --- | --- | --- | --- |
| Lens | Material | R1 (mm) | R2 (mm) | CT (mm) | R1CH (mm) | DIA (mm) |
| 1 | LAFN21 | 2.5732 | −8.0998 | 0.6 | 7.8738 | 2.8 |
| 2 | SF5 | −9.5469 | −2.454 | 0.55 | 7.0738 | 2.55 |
| 3 | SF2 | 7.6121 | −2.8515 | 0.25 | 6.2238 | 2.11 |
| 4 | NBFD3 | 2.8515 | 5.393 | 0.75 | 5.9738 | 2.06 |
| 5 | SF5 | −26.823 | 15.894 | 0.5 | 4.355 | 2.88 |

Note from the table that the overall lateral dimension (diameter) of the projector lens is only 2.88 millimeters, and the diameter of the individual lens that is nearest the spatial light modulator (lens 1) is only 2.8 mm.

The optical modeling simulated the distribution of light produced by the output illumination beam as imaged by the projector lens onto a far-field detector plane, and calculated the brightness or intensity (irradiance) of that far field image as a function of position. The modeling was repeated for different amounts of surface roughness on the curved surface 831a, and the results are shown in FIGS. 9A through 9E. In FIGS. 9A, 9B, 9C, 9D, and 9E, surface roughnesses corresponding to Gaussian diffusion angles of 0.01 degrees, 0.1 degrees, 1 degree, 2 degrees, and 4 degrees respectively were assumed. In the figures, the solid curves 902a, 902b, 902c, 902d, and 902e represent the calculated irradiance-versus-position curves along the horizontal or x-axis in the far-field plane, and the dashed curves 904a, 904b, 904c, 904d, and 904e represent the calculated irradiance-versus-position curves along the vertical or y-axis in the far-field plane. Inspection and comparison of FIGS. 9A through 9E confirms that increased amounts of surface roughness and light scattering yield a more uniform irradiance distribution and less pronounced dark spot or shadow in the center of the image.

The optical modeling software was then used again to establish a comparison between a solid cavity type illuminator and a hollow cavity type illuminator. The results of FIGS. 9A through 9E all assume a solid cavity type illuminator. We simulated a hollow cavity type illuminator by programming the modeling software to replace all of the annealed PMMA material within the reflective cavity with air (refractive index=1), but keeping everything else including the curvatures, distances, reflectivities, and so forth the same. This comparison was done for the case of a surface roughness corresponding to a Gaussian diffusion angle of 1 degree. The results for the solid cavity type system were shown in FIG. 9C, and are reproduced in FIG. 10A for ease of comparison. The results for the corresponding hollow cavity type system are shown in FIG. 10B, where solid curve 1002b represents the calculated irradiance-versus-position curves along the horizontal or x-axis in the far-field plane, and the dashed curve 1004b represents the calculated irradiance-versus-position curves along the vertical or y-axis in the far-field plane. Comparison of FIGS. 10A and 10B confirm the conclusion that a hollow cavity design for the compact illuminator provides improved masking of the shadowing effect and improved spatial uniformity of the output illumination beam.

Figure 11:
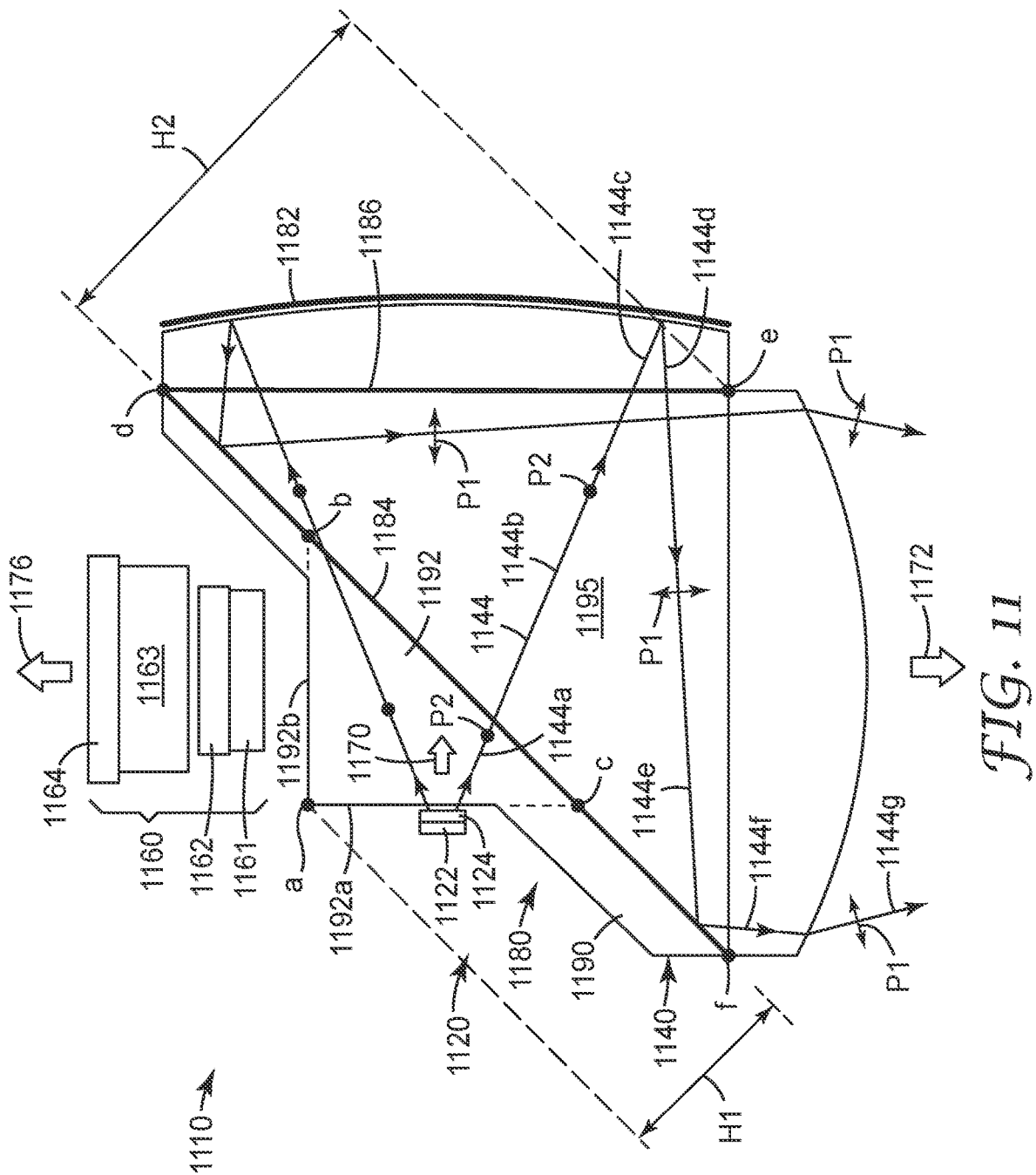
FIG. 11 is a schematic top or side view of another compact projection system, this projector having an illuminator that uses a polarizing beamsplitter of substantially different prism sizes.

Turning now to FIG. 11, we see there a different type of compact illuminator and projector 1110. Rather than using a reflective cavity configuration as depicted in FIG. 1, the projector 1110 uses a polarizing beamsplitter 1180, and the beamsplitter uses opposed prisms of substantially different sizes. The projector also comprises a light source 1120, which includes an LED die 1122 and polarizer 1124, a spatial light modulator 1150 (see FIG. 11A), which includes pixel elements 1152, and projector lens 1160, which includes individual lenses 1161, 1162, 1163, 1164. The light source, spatial light modulator, and projector lens may be the same as or similar to the various light sources, spatial light modulators, and projectors discussed in the preceding embodiments, except that the spatial light modulator in the projector 1110 is designed to operate in reflection rather than in transmission. As a result, the spatial light modulator 1150 may for example be or comprise a Liquid Crystal on Silicon (LCoS) device. Such devices may be flat (as illustrated schematically), or they may include a curved reflector array that is curved in one or more axes.

The light source 1120 emits a polarized input light beam 1170 into the beamsplitter 1180 towards an obliquely disposed reflective polarizer 1184. The reflective polarizer 1184 may be the same as or similar to the reflective polarizers discussed in the preceding embodiments, except that the reflective polarizer 1184 may if desired by optimized for oblique angle performance and in an immersed configuration (surrounded by solid light-transmissive optical materials such as glass or plastic). The reflective polarizer is sandwiched between two opposed prismatic bodies to form the beamsplitter 1180. A first such prismatic body 1190 contains two facets 1192*a*, 1192*b* which define a relatively small prism 1192. The input light beam 1170 enters the beamsplitter 1180 through the facet 1192*a*, and spatially patterned light from the spatial light modulator (as explained below) exits the beamsplitter through the facet 1192*b*. For size comparison purposes, the boundaries of the small prism 1192 can be ascertained by extending the facets 1192*a*, 1192*b* to the reflective polarizer 1184 to define the labeled points c and b, respectively. A third point, a, lies at the intersection of the facets 1192*a*, 1192*b*, at the apex of the small prism 1192. The set of points a, b, c may thus be considered to define the corners of the small prism 1192.

The other prismatic body, opposite the first prismatic body 1190, is a relatively larger prism 1195. The corners of this prism 1195 are clearly seen as labeled points d, e, and f. Attached to the side surfaces of the prism 1195 are lenses or other optical bodies having exterior curved surfaces. In alternative embodiments, one or both of these optical bodies may be combined with the prism 1195 in a unitary prismatic body.

A reflector 1182 is applied to one of these exterior curved surfaces as shown in FIG. 11, and a retarder film 1186 is disposed between the reflector 1182 and the reflective polarizer 1184. The reflector 1182 may be the same as or similar to the reflectors 132, 232, 432, 532, 732 discussed above, e.g., the reflector 1182 may have a high specular reflectivity (for example, in some cases at least 70%, or at least 80%, or at least 90%, or at least 95%) for light within the spectral range of the input light beam 1170, and for all polarization states, and in some cases it also substantially preserves the polarization state of an incident light ray in the reflected ray. The retarder film 1186 may be the same as or similar to the retarding films discussed in the preceding embodiments.

The light source 1120 in combination with the beamsplitter 1180 serves as an illuminator. As will be described in relation to a representative light ray 1144, light from the light source 1120 propagates within the beamsplitter 1180 until it emerges as an output illumination beam 1172. The output illumination beam 1172 illuminates the active area of the spatial light modulator 1150 (see FIG. 11A) so that an optical image or pattern can be produced. In many, but not all, cases, it is desirable for the output illumination beam 1172 to be a converging light beam at the place where it impinges on the spatial light modulator 1150. It is also often desirable for the output illumination beam 1172 to be relatively uniform in brightness over the active area of the spatial light modulator 1150.

In reference to the light ray 1144, a first ray portion 1144*a* is part of the input light beam 1170, which enters the beamsplitter 1180 through the facet 1192*a*. The ray portion 1144*a* is caused by the polarizer 1124 to have a second polarization state P2. The reflective polarizer 1184 is configured and oriented to highly transmit light of the second polarization state P2, and highly reflect light of the orthogonal first polarization state P1. Therefore, upon encountering the reflective polarizer 1184, the ray portion 1144*a* is highly transmitted through the reflective polarizer 1184 into the prism 1195 to become ray portion 1144*b*, still having the second polarization state P2. The ray then passes through the retarder film 1186 to become ray portion 1144*c*, is reflected by the reflector 1182 to become ray portion 1144*d*, and passes through the retarder film 1186 again to become ray portion 1144*e*. As a result of the two passes through the retarder film 1186, the ray portion 1144*e* has the first polarization state P1, orthogonal to the original second polarization state P2. Upon encountering the reflective polarizer 1184, the ray portion 1144*e* is highly reflected to become ray portion 1144*f*, and finally emerging from the lower curved surface of the illuminator as ray portion 1144*g*, which can be considered part of the output illumination beam 1172.

The spatial light modulator 1150 (see FIG. 11A) is placed in the output illumination beam 1172 at the output of the illuminator, and it selectively reflects incident light in an image-wise fashion. For example, pixel elements 1152 in an "on" state may rotate the polarization state of the reflected light by 90 degrees, whereas pixel elements 1152 in an "off" state may produce no such polarization rotation, or vice versa. In either case, the spatial light modulator 1150 converts the output illumination beam 1172 into a reflected patterned light beam 174 which is transmitted through the same beamsplitter 1180, through the facet 1192*b* to the projector lens 1160, as explained below. The projector lens 1160 then transforms the reflected patterned light beam into a projected output beam 1176, analogous to the projected output beams discussed in the preceding embodiments.

One can see that, in connection with the operation of the beamsplitter 1180, it is again important to preserve the polarization state of light propagating within the beamsplitter, except for the deliberate change in polarization caused by the retarder film 1186. It is therefore desirable for the solid light-transmissive optical materials that make up the prisms 1192, 1195 and other optical bodies connected thereto to be made of very low birefringence materials as explained above.

One design feature of the projector 1110 that facilitates miniaturization is the substantial size disparity of the prisms 1192, 1195. By making the prism 1192 substantially smaller than the other prism, the light source 1120, and/or the projector lens 1160, can be brought closer to the reflective polarizer 1184, thus reducing the overall projector size. Note also however that the small prism 1192 need not be microscopic in size relative to the larger prism; instead, the small prism 1192 is large enough so that light that passes through the first prismatic body 1190 is predominantly, or mostly, also transmitted through the small prism 1192. The relative sizes of the opposed prisms can be characterized in terms of their hypotenuse lengths and/or their prism heights. The hypotenuse length of the small prism 1192, which we may call HL1, is the distance between the points b and c, and the hypotenuse length of the other prism 1195, which we may call HL2, is the distance between the points d and f. The prism heights of the prisms 1192, 1195, which we may call H1 and H2, respectively, are illustrated in FIG. 11 as being measured relative to the reflective polarizer 1184. To characterize the size disparities of the opposed prisms, we may specify that the ratio HL1/HL2 is in a range from 40% to 70%, and/or that the ratio H1/H2 is similarly in a range from 40% to 70%.

Figure 11A:
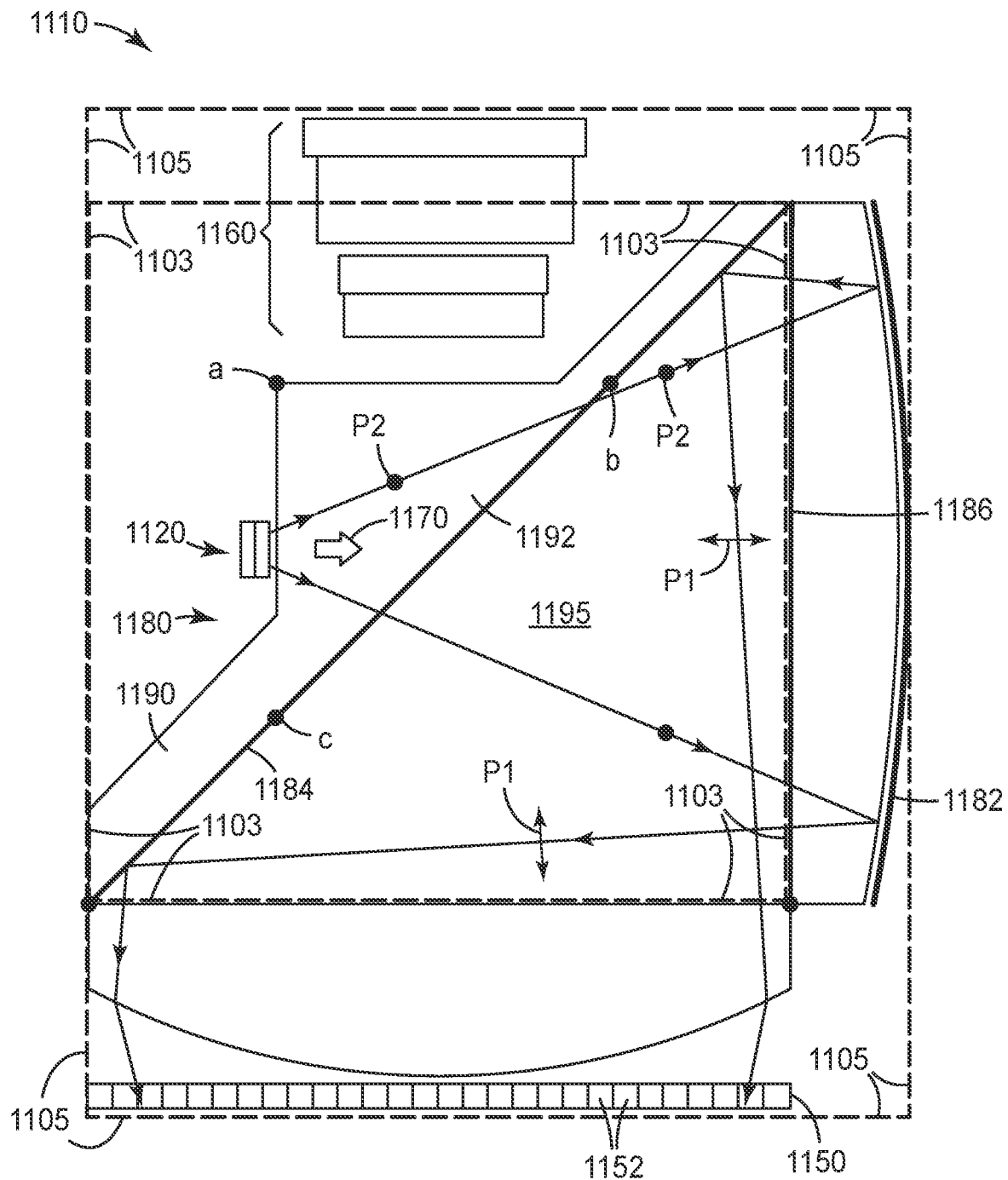
FIG. 11A is the same schematic view as FIG. 11, but with two rectangular reference spaces superimposed on the projector.

FIG. 11A is a substantial duplicate of FIG. 11, where like reference numbers designate like elements with no further need for discussion, except that the reflective spatial light modulator 1150, already described above, is now shown in its proper position to intercept the output illumination beam 1172. Superimposed on the figure are two rectangular reference spaces 1103, 1105. The first reference space 1103 is a rectangular space defined by the obliquely oriented reflective polarizer 1184. More specifically, the reference space 1103 is a rectangle whose diagonal line is the reflective polarizer 1184. This roughly corresponds to the rectangular space occupied by a conventional beamsplitter. On the other hand, the second reference space 1105 may be described as the smallest rectangular space that encompasses the optical components (exclusive of any mechanical mounting hardware or the like) of the projector. For the projector 1110, those optical components are the beamsplitter 1180, the light source 1120, the spatial light modulator 1150, and the projector lens 1160.

As a result of our miniaturization efforts, several new relationships can be satisfied by the projector 1110 and/or other disclosed projectors.

For example, at least a portion of the light source 1120, or at least a portion of the projector lens 1160, are disposed within the first rectangular reference space 1103. In some cases at least a portion of the light source 1120 and at least a portion of the projector lens 1160 are both disposed within the first rectangular reference space 1103. In some cases, at least a portion of the light source, or at least a portion of the projector lens, but not both, are disposed within the first rectangular reference space 1103. The first rectangular reference space 1103 may be split into two portions, along the diagonal of the reflective polarizer 1184. When so split, the at least a portion of the light source 1120, or the at least a portion of the projector lens 1160, is disposed within one such portion of the first rectangular reference space 1103. Furthermore, the at least a portion of the light source and the at least a portion of the projector lens may both be disposed within such portion of the first rectangular reference space 1103. If the light source 1120 comprises an LED die 1122, the LED die 1122 may be entirely disposed within the first rectangular reference space 1103. If the projector lens 1160 comprises a plurality of individual lenses 1161, 1162, 1163, 1164, at least one of the individual lenses may be entirely disposed within the first rectangular reference space 1103.

Also, the projector can be miniaturized to such an extent that the optical components of the projector (exclusive of any mechanical mounting hardware or the like) can fit within a space that is only slightly larger than the space occupied by a conventional beamsplitter for that projector. Stated differently, if A1 is the area of the first rectangular reference space 1103, and A2 is the area of the second rectangular reference space 1105, then the ratio of A1/A2 may be in a range from 30% to 70%, or from 40% to 70%.

The foregoing relationships relating to reference spaces, locations of elements within or outside of such spaces, comparisons of areas of such spaces, and so forth can be ascertained with reasonable accuracy by reference to FIGS. 11 and 11A despite the fact that these figures are schematic in nature. Although schematic, the relative sizes and positions of pertinent system components in these figures are believed to be reasonably representative of how such components would appear in an actual scale drawing. This can also be said for at least FIGS. 14, 14B, 15, and 15A below. Based on FIG. 11A, the ratio of the area of reference space 1103 to the area of reference space 1105 (A1/A2) is at least 60%.

Figure 11B:
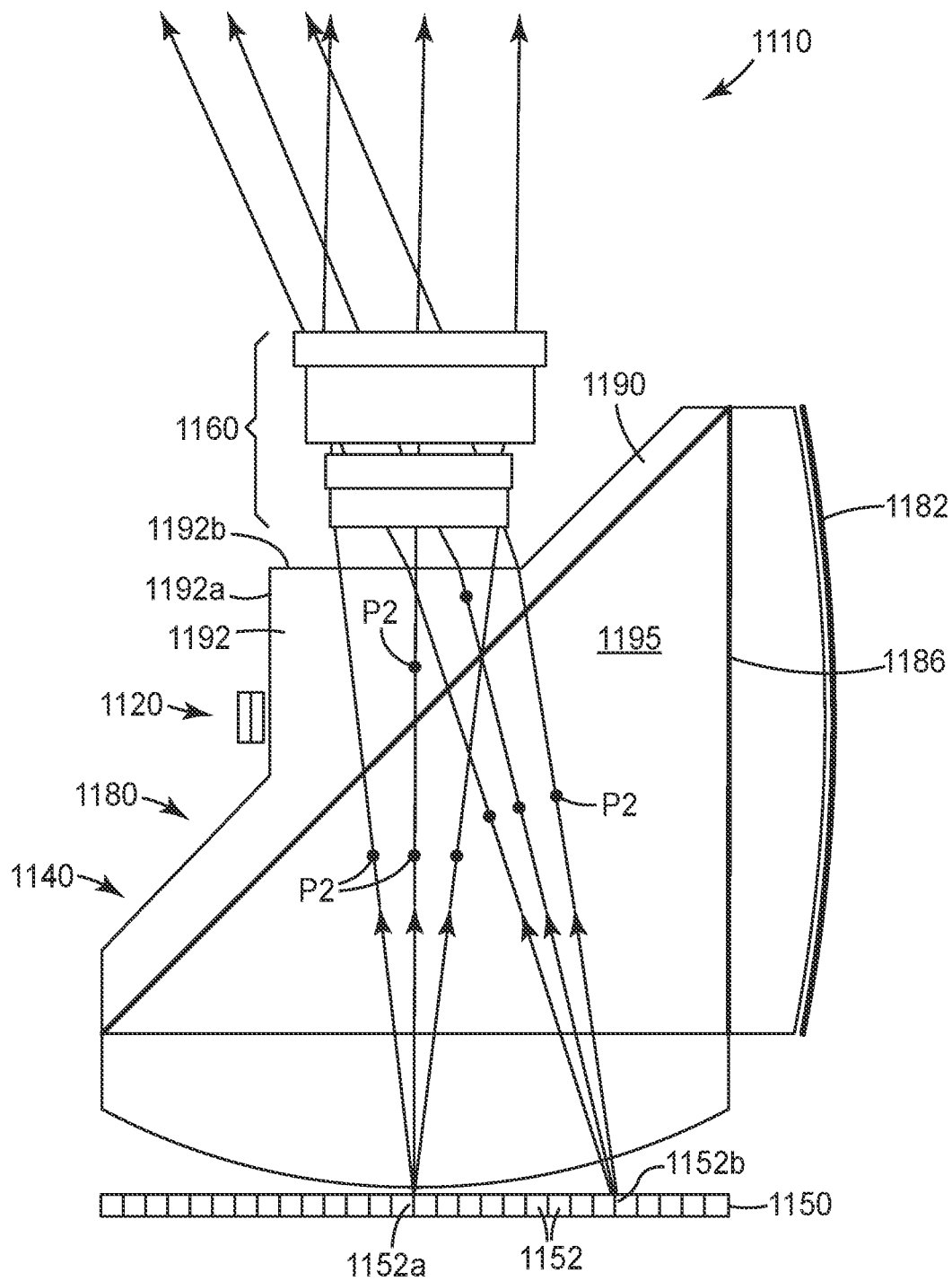
FIG. 11B is the same schematic view as FIG. 11, but with on-axis and off-axis image rays of a pass polarization state drawn to show their propagation through the system.
Figure 11C:
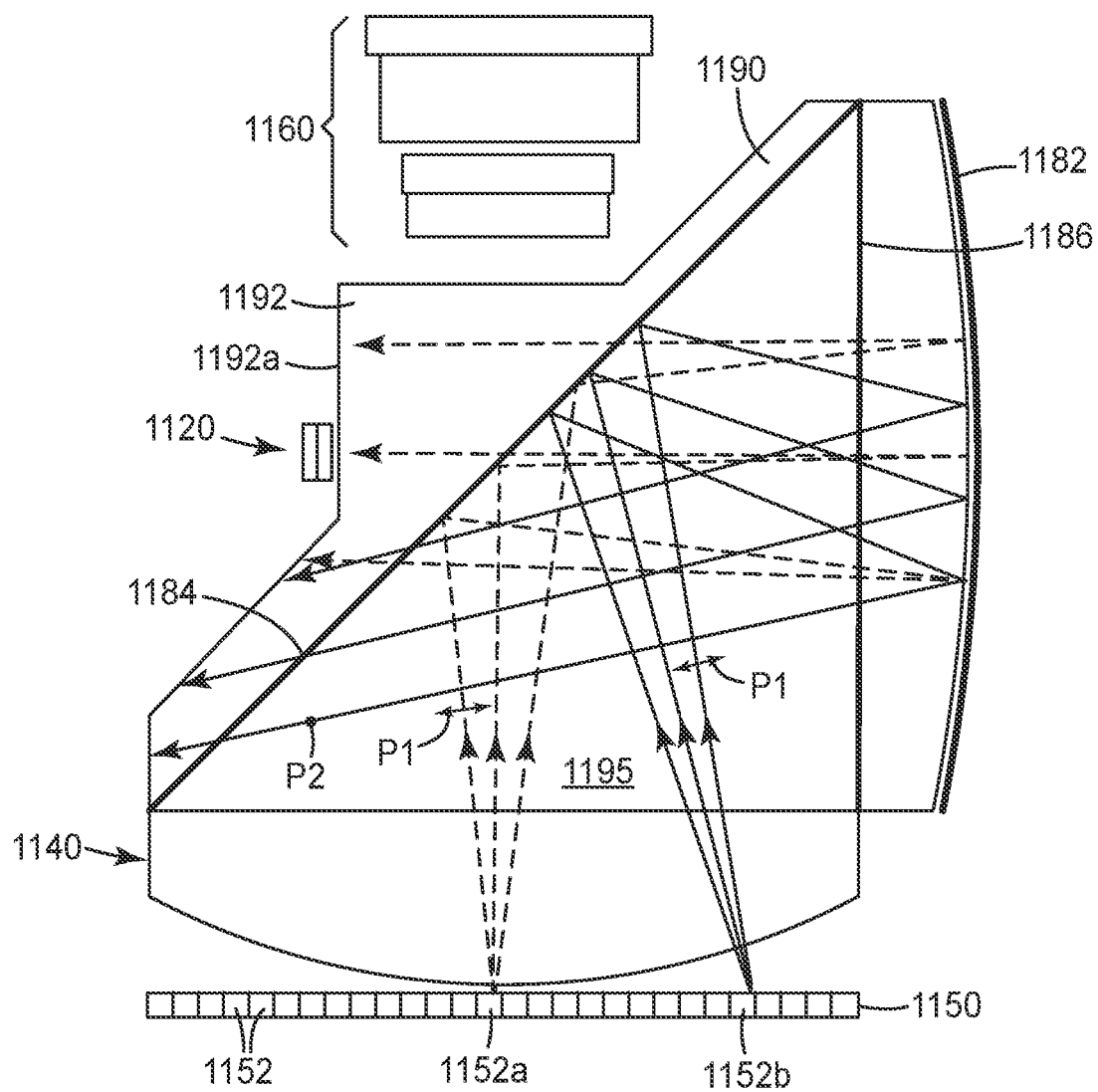
FIG. 11C is the same schematic view as FIG. 11, but with on-axis and off-axis image rays of a block polarization state drawn to show their propagation through the system.

FIGS. 11B and 11C are provided to further illustrate the passage of light through the projector 1110 after the output illumination beam 1172 is reflected by the spatial light modulator 1150. FIG. 11B covers the case of light reflected by "on" pixels of the modulator 1150, whereas FIG. 11C covers the case of light reflected by "off" pixels of the modulator. Otherwise, in these figures, like reference numbers to those in FIGS. 11 and 11A refer to like elements, and need no further explanation.

In FIG. 11B, light from the output illumination beam 1172 is reflected by an on-axis pixel 1152a and by an off-axis pixel 1152b, both of these pixels assumed to be in an "on" state such that the reflected light has a rotated polarization, i.e., the reflected light has the second polarization state P2 rather than state P1. Light of this polarization state P2 is highly transmitted by the reflective polarizer 1184. Thus, the light reflected by the "on" pixels is transmitted through the reflective polarizer 1184 and exits the beamsplitter 1180 through the facet 1192b of the prism 1192, and is collected by the projector lens 1160 to ultimately form the projected output beam 1176.

On the other hand, in FIG. 11C, light from the output illumination beam 1172 is again reflected by the on-axis pixel 1152a and by the off-axis pixel 1152b, but now these pixels are assumed to be in an "off" state such that the reflected light does not have a rotated polarization, i.e., the reflected light has the first polarization state P1. Light of this polarization state P1 is highly reflected by the reflective polarizer 1184. Thus, the light reflected by the "off" pixels is reflected by the reflective polarizer 1184 and thereafter reflected by the reflector 1182 towards the left side of the beamsplitter 1180, where such rays may be absorbed or otherwise lost. Light reflected by the "off" pixels thus do not get collected by the projector lens 1160, and do not substantially contribute to the projected output beam 1176.

Figure 13:
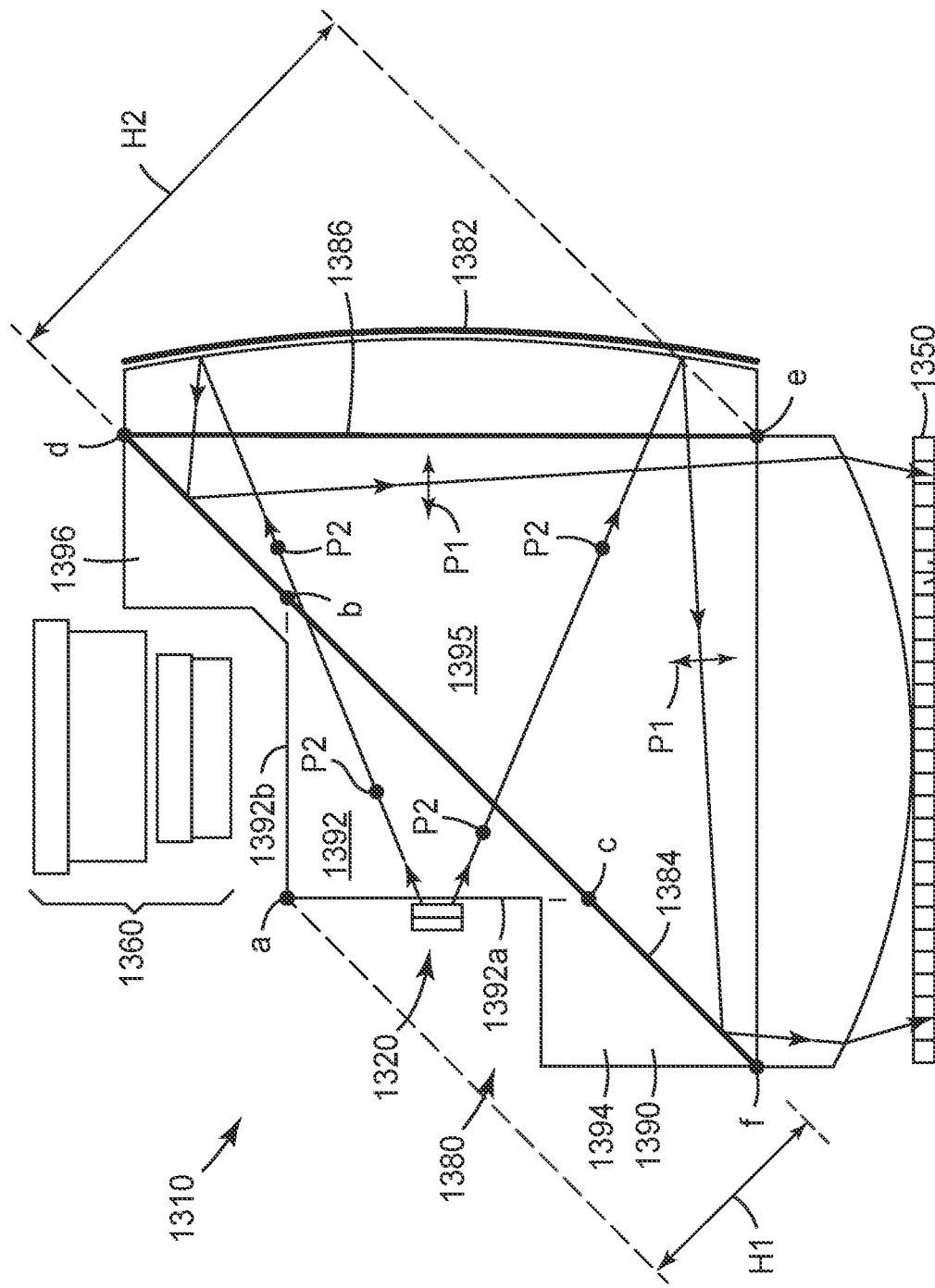
FIG. 13 is a schematic top or side view of another compact projection system, this projector also having an illuminator that uses a polarizing beamsplitter of substantially different prism sizes.

FIGS. 12 and 13 represent modifications to the projector 1110, where the first prismatic body 1190 is replaced by alternative prismatic bodies. These replacements do not substantially change the manner in which light propagates between the light source, spatial light modulator, and projection lens, and thus that description will not be repeated for these figures.

In FIG. 12, a projector 1210 uses a polarizing beamsplitter 1280 having opposed prisms of substantially different sizes. The projector 1210 also comprises a light source 1220, a spatial light modulator 1250 which includes pixel elements 1252, and a projector lens 1260 which includes individual lenses, and all of these elements may be the same as or similar to corresponding elements in the projector 1110.

The beamsplitter 1280 includes an obliquely disposed reflective polarizer 1284 sandwiched between two opposed prismatic bodies: a first such prismatic body 1290 contains two facets 1292a, 1292b which define a relatively small prism 1292, and the other prismatic body is a relatively larger prism 1295. Polarized light from the light source 1220 enters the beamsplitter 1280 through the facet 1292a, and spatially patterned light from the spatial light modulator 1250 exits the beamsplitter through the facet 1292b. The boundaries of the small prism 1292 can be ascertained by extending the facets 1292a, 1292b to the reflective polarizer 1284 to define the labeled points c and b, respectively, and a third point, a, lies at the intersection of the facets 1292a, 1292b. The corners of the larger prism 1295 are clearly seen as labeled points d, e, and f. Attached to the side surfaces of the prism 1295 are lenses or other optical bodies having exterior curved surfaces. A reflector 1282 is applied to one of these exterior curved surfaces, and a retarder film 1286 is disposed between the reflector 1282 and the reflective polarizer 1284. The reflector 1282 and retarder film 1286 may be the same as or similar to corresponding elements of the projector 1110. The light source 1220 in combination with the beamsplitter 1280 serves as an illuminator. Light that is reflected by "on" pixels of the spatial light modulator is transmitted through the reflective polarizer 1284 and exits the beamsplitter 1280 through the facet 1292*b* of the prism 1292, and is collected by the projector lens 1260 to ultimately form the projected output beam 1276.

In this embodiment, the first prismatic body 1290 covers only a portion of the reflective polarizer 1284, and the first prismatic body 1290 comprises no prisms other than the prism 1292. The locations of the points a, b, c, d, e, f may be substantially the same as corresponding points in the projector 1110, hence, the prism dimensions H1, H2, HL1, and HL2, and their various ratios may satisfy the same conditions as discussed above.

In FIG. 13, a projector 1310 uses a polarizing beamsplitter 1380 having opposed prisms of substantially different sizes. The projector 1310 also comprises a light source 1320, a spatial light modulator 1350 which includes pixel elements 1352, and a projector lens 1360 which includes individual lenses, and all of these elements may be the same as or similar to corresponding elements in the projector 1110.

The beamsplitter 1380 includes an obliquely disposed reflective polarizer 1384 sandwiched between two opposed prismatic bodies: a first such prismatic body 1390 contains two facets 1392*a*, 1392*b* which define a relatively small prism 1392, and the other prismatic body is a relatively larger prism 1395. Polarized light from the light source 1320 enters the beamsplitter 1380 through the facet 1392*a*, and spatially patterned light from the spatial light modulator 1350 exits the beamsplitter through the facet 1392*b*. The boundaries of the small prism 1392 can be ascertained by extending the facets 1392*a*, 1392*b* to the reflective polarizer 1384 to define the labeled points c and b, respectively, and a third point, a, lies at the intersection of the facets 1392*a*, 1392*b*. The corners of the larger prism 1395 are clearly seen as labeled points d, e, and f. Attached to the side surfaces of the prism 1395 are lenses or other optical bodies having exterior curved surfaces. A reflector 1382 is applied to one of these exterior curved surfaces, and a retarder film 1386 is disposed between the reflector 1382 and the reflective polarizer 1384. The reflector 1382 and retarder film 1386 may be the same as or similar to corresponding elements of the projector 1110. The light source 1320 in combination with the beamsplitter 1380 serves as an illuminator.

In this embodiment, the first prismatic body 1390 covers substantially all of the reflective polarizer 1384, and the first prismatic body 1390 comprises two prisms—prism 390 and prism 396—in addition to the prism 1392. The locations of the points a, b, c, d, e, f may be substantially the same as corresponding points in the projector 1110, hence, the prism dimensions H1, H2, HL1, and HL2, and their various ratios may satisfy the same conditions as discussed above.

Figure 14A:
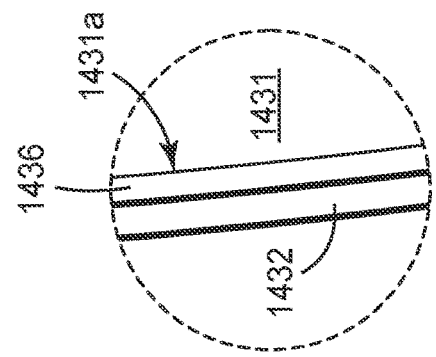
FIG. 14A is a magnified schematic view of the reflecting layer and the retarding layer on the outer surface of the optical body in FIG. 14.
Figure 14:
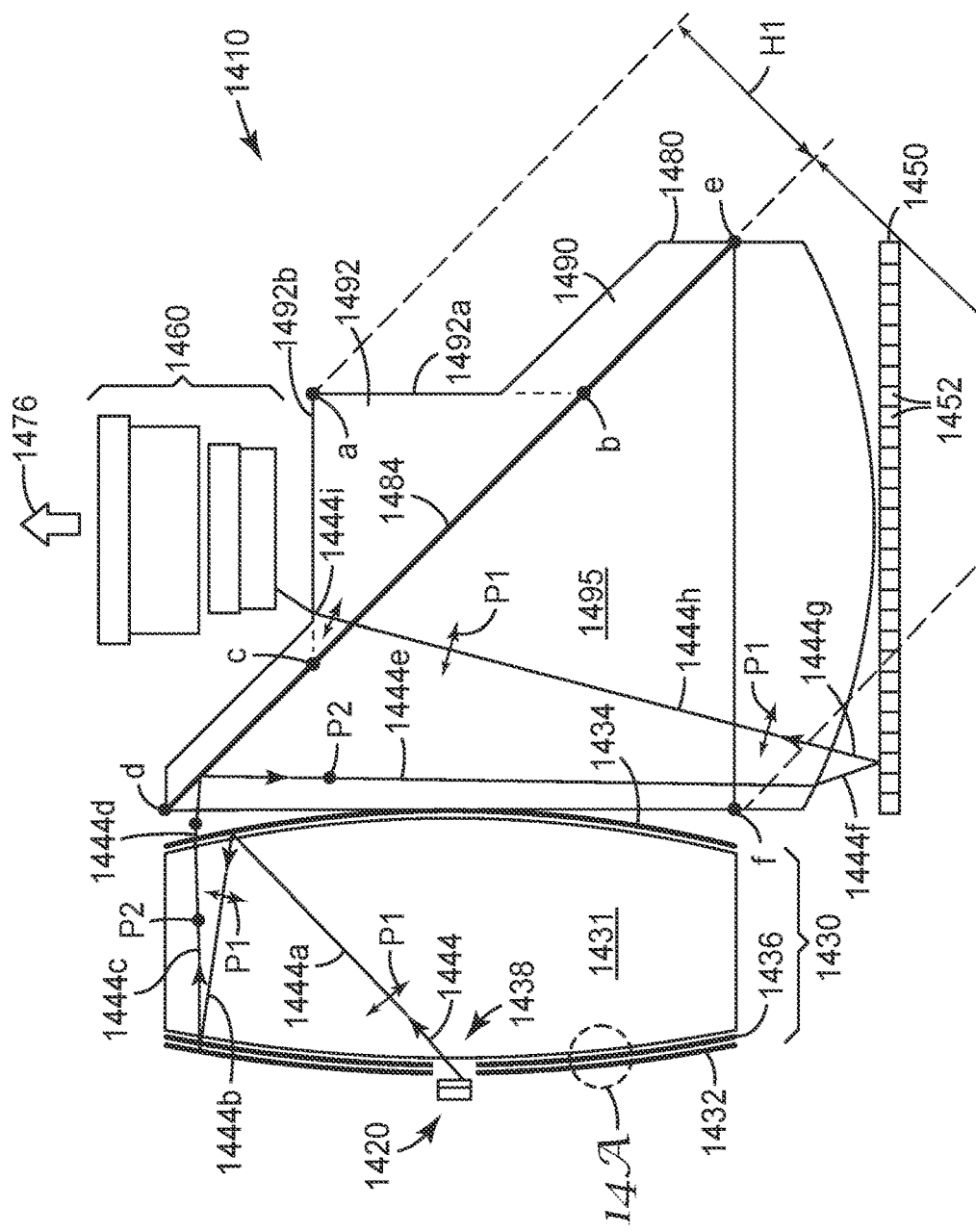
FIG. 14 is a schematic top or side view of another compact projection system, this projector having an illuminator that uses both a reflective cavity and a polarizing beamsplitter of substantially different prism sizes.

FIG. 14 illustrates still another compact projector 1410 and illuminator. This projector combines the reflective cavity configuration depicted in FIG. 1 with the use of a polarizing beamsplitter having opposed prisms of substantially different sizes.

In this case, a light source 1420 injects an input light beam into a reflective cavity 1430 formed by a reflector 1432 and a reflective polarizer 1434. A retarder film 1436 is disposed in the cavity, and an aperture 1438 is provided in the reflector 1432 and the retarder film 1436. The reflector 1432, reflective polarizer 1434, and retarder film 1436 may be applied to the outer surfaces of an optical lens or body 1431 as shown, and may otherwise be the same as or similar to corresponding components of the reflective cavity 430 in FIG. 4. Light that exits the reflective cavity 1430 enters a polarizing beamsplitter 1480.

The polarizing beamsplitter 1480 includes an obliquely disposed reflective polarizer 1484 sandwiched between two opposed prismatic bodies: a first such prismatic body 1490 contains two facets 1492*a*, 1492*b* which define a relatively small prism 1492, and the other prismatic body is a relatively larger prism 1495. Polarized light exiting the reflective cavity 1430 enters the beamsplitter 1480 through a facet of the prism 1495, and is reflected by the reflective polarizer 1484 so that it exits the beamsplitter 1480 and impinges upon the spatial light modulator 1450. Light whose polarization is rotated by "on" pixels of the spatial light modulator 1450 re-enter the beamsplitter 1480 and now pass through the reflective polarizer 1484, traverse the small prism 1492, and exit the beamsplitter 1480 by the facet 1492*b*. The boundaries of the small prism 1492 can be ascertained by extending the facets 1492*a*, 1492*b* to the reflective polarizer 1484 to define the labeled points c and b, respectively, and a third point, a, lies at the intersection of the facets 1492*a*, 1492*b*. The corners of the larger prism 1495 are clearly seen as labeled points d, e, and f. Attached to the lower side surface of the prism 1495 is a lens or other optical body having an exterior curved surface for optional focusing or convergence of the exiting illumination beam. In this embodiment, the beamsplitter 1480 need not contain any retarder film or reflector other than the reflective polarizer 1484.

The prisms 1492, 1495 have respective prism heights H1 and H2 as shown, and these parameters, as well as the respective hypotenuse lengths HL1 and HL2, and their various ratios, may satisfy the same conditions discussed above.

With reference to representative light ray 1444, a first ray portion 1444*a* has a first polarization state P1 which is substantially reflected by the reflective polarizer 1434, such that the reflected ray portion 1444*b* passes through the retarder film 1436 and is reflected by the reflector 1432. This reflection results in the ray portion 1444*c* which passes again through the retarder film 1436, thereupon acquiring the second polarization state P2 which is highly transmitted by the reflective polarizer 1434. The ray portion 1444*c* thus passes through the reflective polarizer 1434 to provide ray portion 1444*d*, which enters the beamsplitter 1480 and is reflected by the reflective polarizer 1484 to produce reflected ray portion 1444*e*. This ray exits the beamsplitter 1480 as ray portion 1444*f*, reflects from an "on" pixel of the spatial light modulator 1450 (thus rotation the polarization state from P2 back to P1) as ray portion 1444*g*, re-enters the beamsplitter 1480 as ray portion 1444*h* (still of polarization state P1), now passes through the reflective polarizer 1484, traverses the prism 1492 as ray portion 1444*i*, and exits the beamsplitter 1480 at facet 1492*b* on its way to the projector lens 1460. Such light collected by the projector lens 1460 ultimately forms the projected output beam 1476 of the projector 1410.

FIG. 14A is a magnified view of the reflector 1432 and retarder film 1436 on the outer surface 1431*a* of the optical body 1431.

Figure 14B:
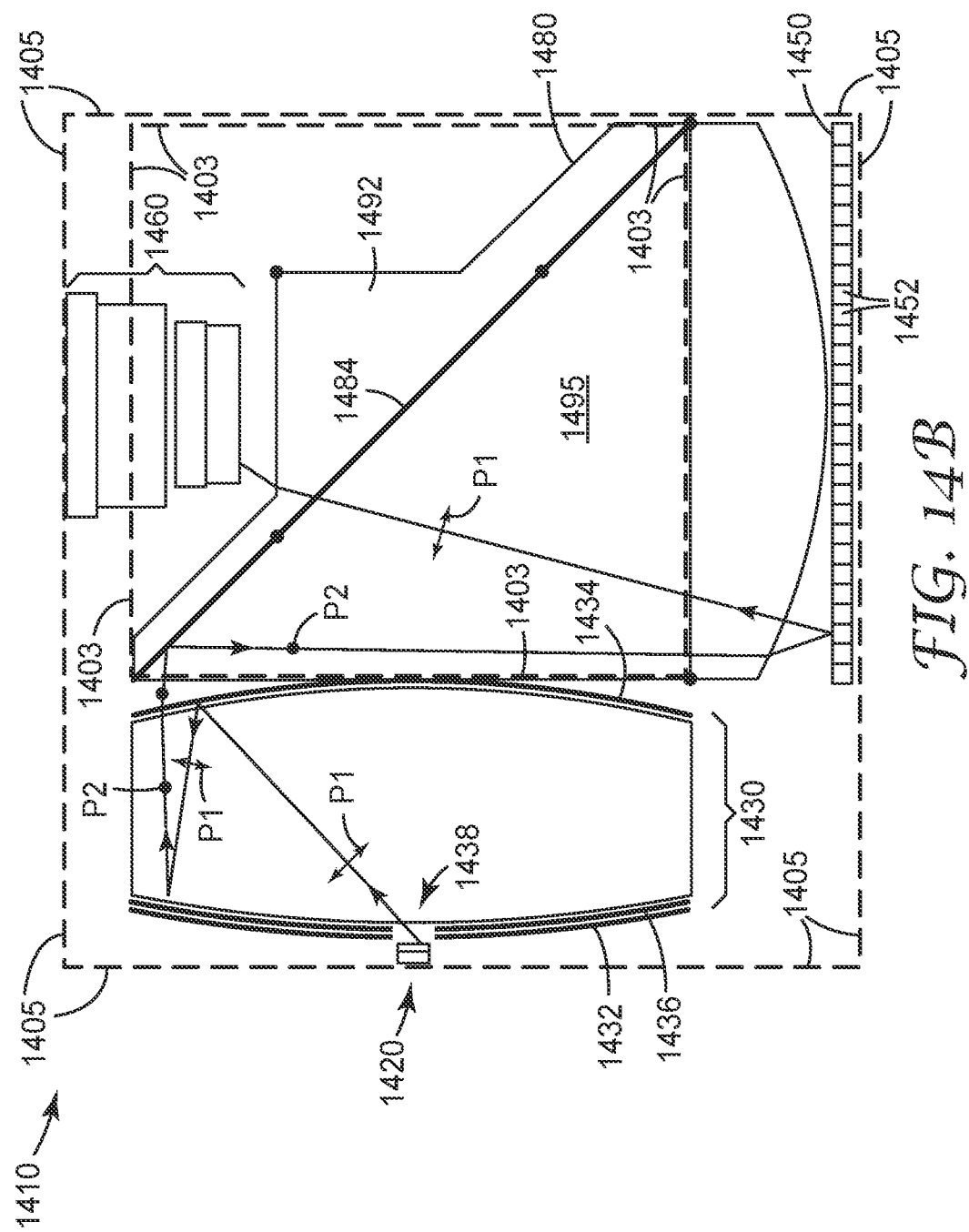
FIG. 14B is the same schematic view as FIG. 14, but with two rectangular reference spaces superimposed on the projector.

FIG. 14B is a substantial duplicate of FIG. 14, where like reference numbers designate like elements with no further need for discussion, and where two rectangular reference spaces 1403, 1405 are superimposed on the figure. A first reference space 1403 is a rectangular space defined by the obliquely oriented reflective polarizer 1484. More specifically, the reference space 1403 is a rectangle whose diagonal line is the reflective polarizer 1484. A second reference space 1405 is the smallest rectangular space that encompasses the optical components of the projector, i.e., the beamsplitter 1480, the light source 1420, the spatial light modulator 1450, and the projector lens 1460. The relationships discussed above with respect to corresponding rectangular reference spaces, in connection with FIG. 11, can be seen to apply at least in part to the reference spaces 1403, 1405 of the projector 1410 also. In particular, the ratio of the area of reference space 1403 to the area of reference space 1405 (A1/A2) is at least 45%.

Figure 15:
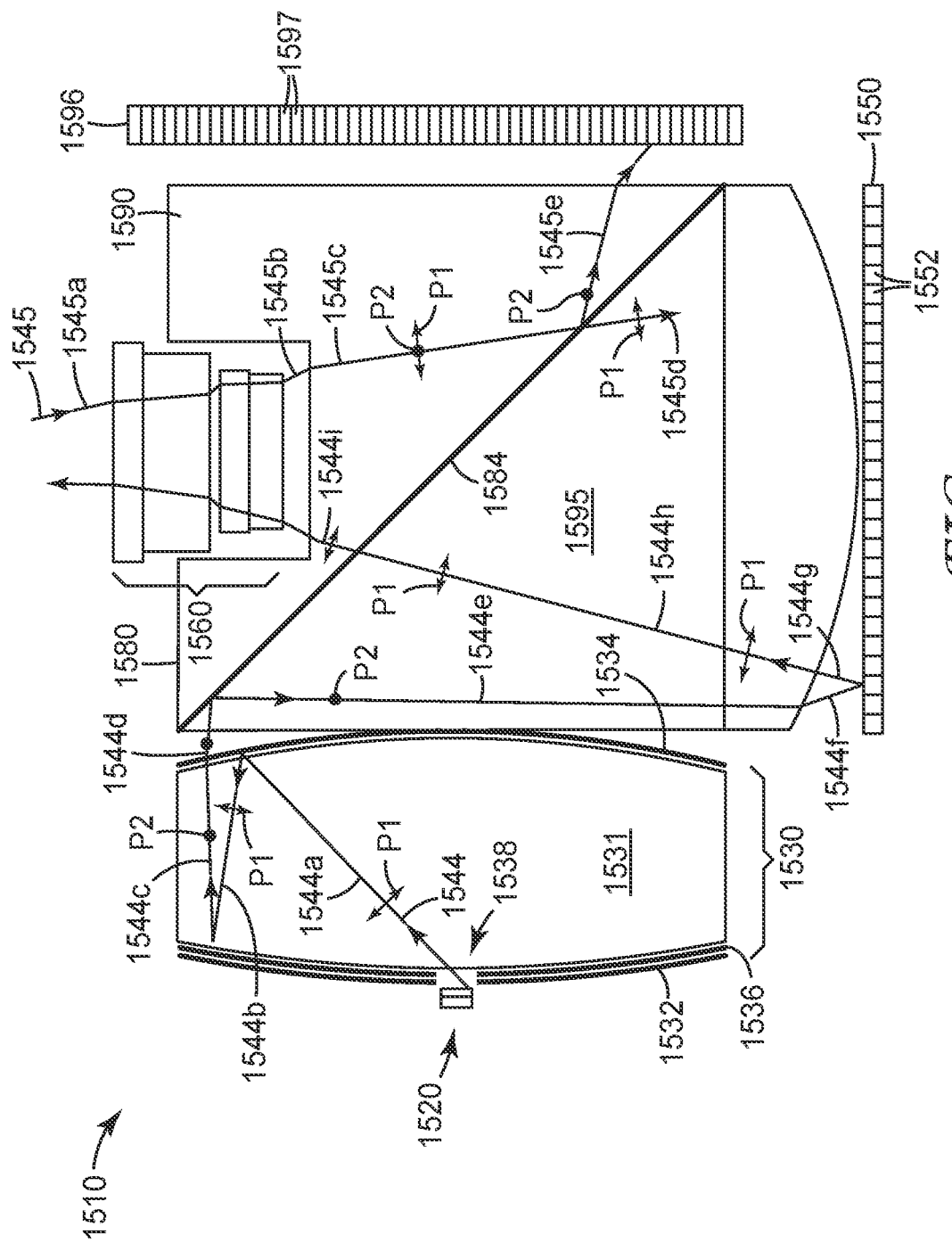
FIG. 15 is a schematic top or side view of another compact projection system, this projector having an illuminator that uses both a reflective cavity and a polarizing beamsplitter, the projection system also including a detector device.

The projector 1510 of FIG. 15 is similar to that of FIG. 14 insofar as it also combines the reflective cavity configuration depicted in FIG. 1 with the use of a polarizing beamsplitter. However, the projector 1510 also makes use of an unused side of the beamsplitter by adding a detector device, such that the projector 1510 is also capable of functioning as a camera.

A light source 1520 injects an input light beam into a reflective cavity 1530 formed by a reflector 1532 and a reflective polarizer 1534. A retarder film 1536 is disposed in the cavity, and an aperture 1538 is provided in the reflector 1532 and the retarder film 1536. The reflector 1532, reflective polarizer 1534, and retarder film 1536 may be applied to the outer surfaces of an optical lens or body 1531 as shown, and may otherwise be the same as or similar to corresponding components of the reflective cavity 430 in FIG. 4. Light that exits the reflective cavity 1530 enters a polarizing beamsplitter 1580.

The polarizing beamsplitter 1580 includes an obliquely disposed reflective polarizer 1584 sandwiched between two opposed prismatic bodies: a first prismatic body 1590 and a second prismatic body or prism 1595. Polarized light exiting the reflective cavity 1530 enters the beamsplitter 1580 through a facet of the prism 1595, and is reflected by the reflective polarizer 1584 so that it exits the beamsplitter 1580 and impinges upon the spatial light modulator 1550. Light whose polarization is rotated by "on" pixels of the spatial light modulator 1550 re-enter the beamsplitter 1480 and now pass through the reflective polarizer 1584, traverse the prismatic body 1590, and exit the beamsplitter 1580 in a well or hole sized to fit at least a part of the projector lens 1560. Attached to the lower side surface of the prism 1595 is a lens or other optical body having an exterior curved surface for optional focusing or convergence of the exiting illumination beam. In this embodiment, the beamsplitter 1580 need not contain any retarder film or reflector other than the reflective polarizer 1584.

With reference to representative light ray 1544, a first ray portion 1544*a* has a first polarization state P1 which is substantially reflected by the reflective polarizer 1534, such that the reflected ray portion 1544*b* passes through the retarder film 1536 and is reflected by the reflector 1532. This reflection results in the ray portion 1544*c* which passes again through the retarder film 1536, thereupon acquiring the second polarization state P2 which is highly transmitted by the reflective polarizer 1534. The ray portion 1544*c* thus passes through the reflective polarizer 1534 to provide ray portion 1544*d*, which enters the beamsplitter 1580 and is reflected by the reflective polarizer 1584 to produce reflected ray portion 1544*e*. This ray exits the beamsplitter 1580 as ray portion 1544*f*, reflects from an "on" pixel of the spatial light modulator 1550 (thus rotation the polarization state from P2 back to P1) as ray portion 1544*g*, re-enters the beamsplitter 1580 as ray portion 1544*h* (still of polarization state P1), now passes through the reflective polarizer 1584, traverses the prismatic body 1590 as ray portion 1544*i*, and exits the beamsplitter 1580 on its way to the projector lens 1560. Such light collected by the projector lens 1560 ultimately forms a projected output beam of the projector 1510.

Incoming light ray 1545 represents light originating from a body outside of the projector, but passing through the projector lens 1545. A first ray portion 1545*a* enters the projector lens 1560, exits the lens 1560 as ray portion 1545*b*, and enters the beamsplitter 1580 as ray portion 1545*c*. Assuming the ray portion 1545*a* was originally unpolarized, the ray portion 1545*c* will also be unpolarized, and will contain both components of the first polarization state P1 and of the second polarization state P2 as shown. When the ray portion 1545*c* encounters the reflective polarizer 1584, the P1 polarization state will be transmitted into a ray portion 1545*d*, and the P2 polarization state will be reflected into a ray portion 1545*e*, which then exits the beamsplitter 1580 at an unused facet thereof, where a detector device 1596 has been placed. The detector device 1596 is shown as having an array of detector elements, such as in a charge-coupled device (CCD) detector array, but other known detector arrays or even an individual detector element may also be used. By including the detector device 1596 in the projector 1510, the same projector lens 1560 that is used to project an image to a remote location can also be used to collect light from the remote location and capture that light as a camera image or the like. Such a detector device can also be incorporated into the projector 1410 of FIG. 14 by placing the same or similar array at the unused facet 1492*a*, or at a spaced distance from such facet 1492*a* with one or more lenses or other optical elements disposed therebetween.

Figure 15A:
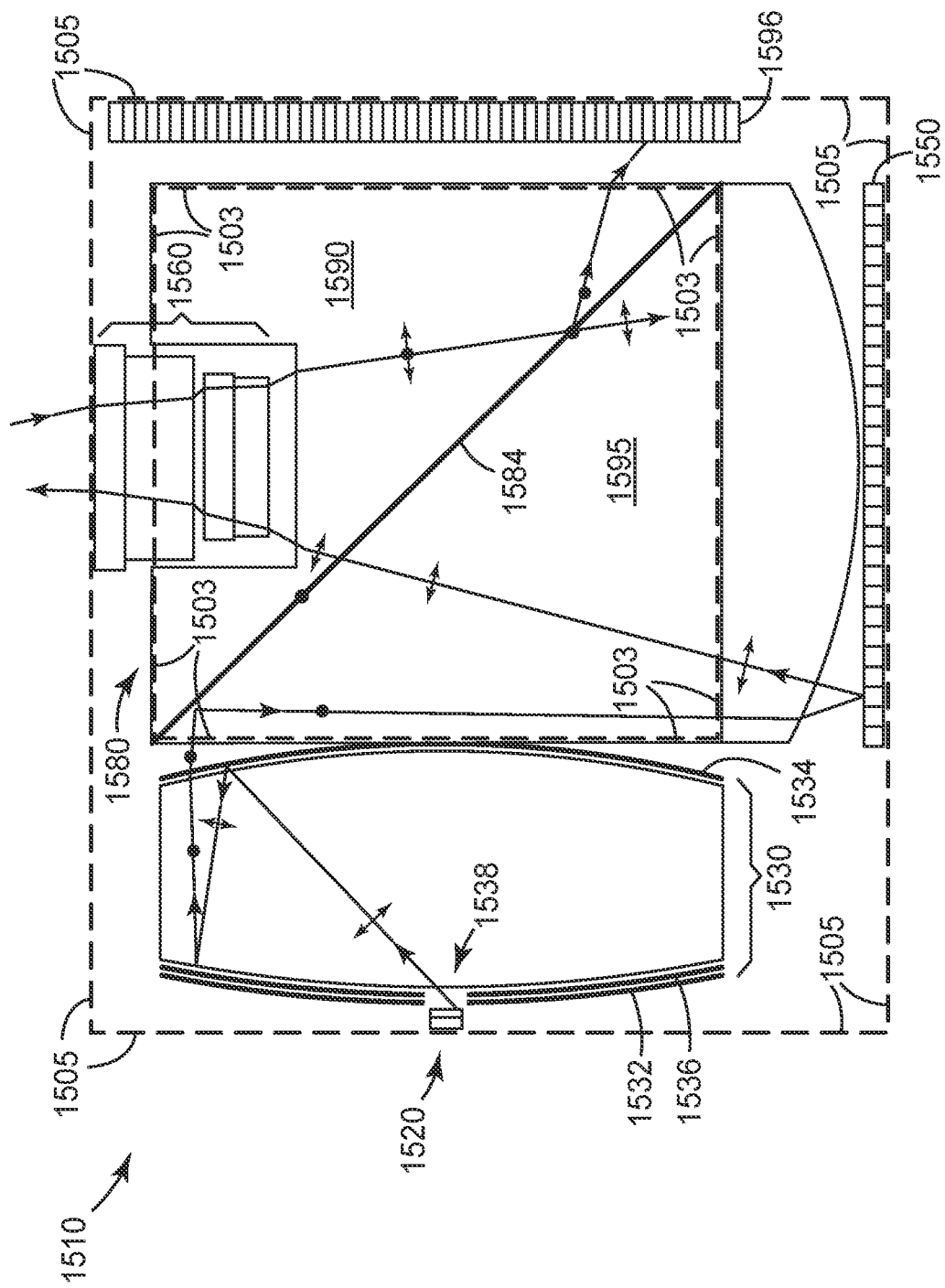
FIG. 15A is the same schematic view as FIG. 15, but with two rectangular reference spaces superimposed on the projector.

FIG. 15A is a substantial duplicate of FIG. 15, where like reference numbers designate like elements with no further need for discussion, and where two rectangular reference spaces 1503, 1505 are superimposed on the figure. A first reference space 1503 is a rectangular space defined by the obliquely oriented reflective polarizer 1584. More specifically, the reference space 1503 is a rectangle whose diagonal line is the reflective polarizer 1584. A second reference space 1505 is the smallest rectangular space that encompasses the optical components of the projector, namely, the beamsplitter 1580, the light source 1520, the spatial light modulator 1550, the projector lens 1560, and the detector device 1596. The relationships discussed above with respect to corresponding rectangular reference spaces, in connection with FIG. 11, can be seen to apply at least in part to the reference spaces 1503, 1505 of the projector 1510 also. In particular, the ratio of the area of reference space 1503 to the area of reference space 1505 (A1/A2) is at least 40%.

Figure 16:
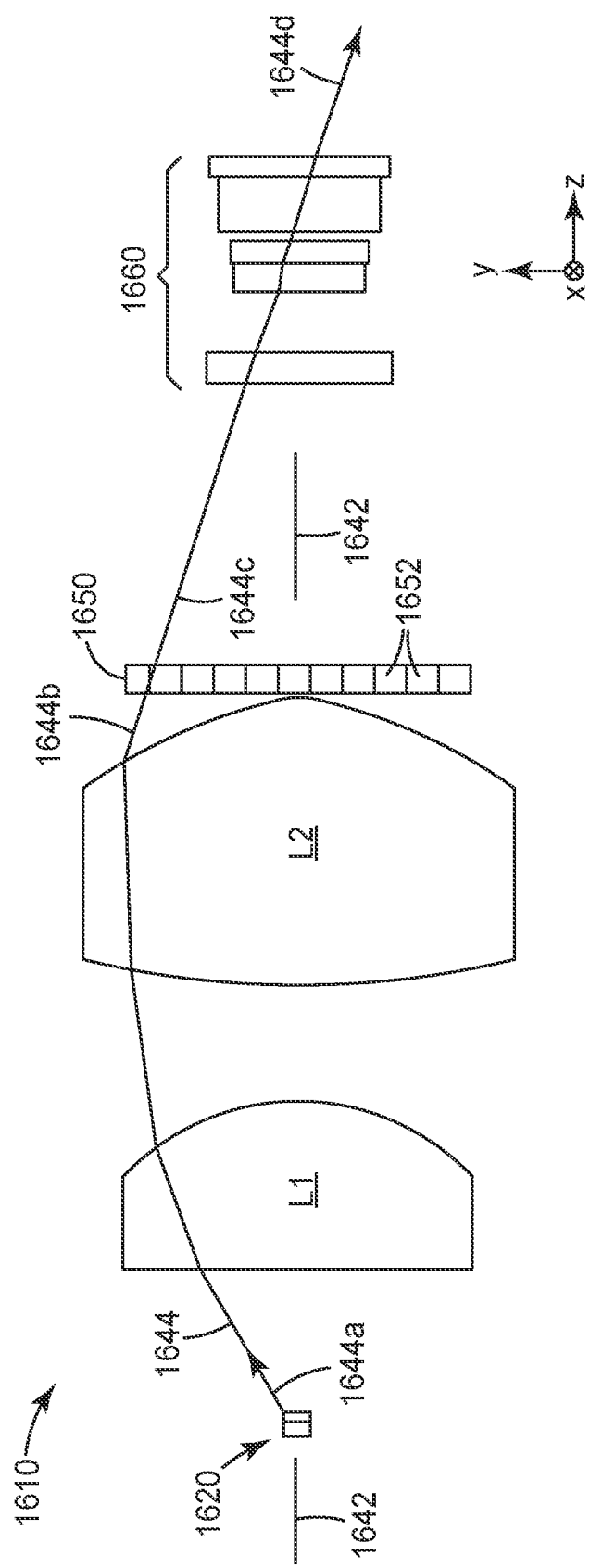
FIG. 16 is a schematic side view of another projection system.

FIG. 16 schematically illustrates still another projector and illumination system. The projector 1610 requires no reflective cavity or beamsplitter. Rather, light from a light source 1620, as represented by ray portion 1644*a* of a representative light ray 1644, is simply collected by a pair of lenses L1, L2, although more or fewer than two lenses can be used. The lenses focus the light to produce a converging output illumination beam, represented by ray portion 1644*b*. This beam impinges upon a transmissive spatial light modulator 1650, producing a spatially patterned beam as represented by ray portion 1644*c*. The spatially patterned beam is then collected and projected to a remote location by a projector lens 1660. As a result of the converging illumination beam, the projector lens 1660, or at least one of its individual component lenses, may have a maximum lateral dimension LD1 (e.g. as measured along the x-axis, or along the y-axis, or along a diagonal of the spatial light modulator 1650) that is less than the corresponding lateral dimension LD2 of the spatial light modulator 1650, or that alternatively satisfies the relationship 30%<LD1/LD2<70%

Unless otherwise indicated, all numbers expressing quantities, measurement of properties, and so forth used in the specification and claims are to be understood as being modified by the term "about". Accordingly, unless indicated to the contrary, the numerical parameters set forth in the specification and claims are approximations that can vary depending on the desired properties sought to be obtained by those skilled in the art utilizing the teachings of the present application. Not as an attempt to limit the application of the doctrine of equivalents to the scope of the claims, each numerical parameter should at least be construed in light of the number of reported significant digits and by applying ordinary rounding techniques. Notwithstanding that the numerical ranges and parameters setting forth the broad scope of the invention are approximations, to the extent any numerical values are set forth in specific examples described herein, they are reported as precisely as reasonably possible. Any numerical value, however, may well contain errors associated with testing or measurement limitations.

The following are embodiments of the present invention.

Embodiment 1 is a compact projector, comprising: a beamsplitter comprising a reflective polarizer, the reflective polarizer obliquely disposed to define a diagonal of a first rectangular reference space; a light source disposed proximate the reflective polarizer, the light source configured to emit an input light beam towards the reflective polarizer; a spatial light modulator disposed to receive an output illumination beam derived from the input light beam, the spatial light modulator adapted to selectively reflect the output illumination beam to provide a patterned light beam; and a projector lens adapted to receive the patterned light beam; wherein the beamsplitter, the light source, the spatial light modulator, and the projector lens are encompassed by a second rectangular reference space; and wherein the first rectangular reference space has an area A1 and the second rectangular reference space has an area A2, and wherein 30%<A1/A2<70%.

Embodiment 2 is the projector of embodiment 1, wherein 40%<A1/A2<70%.

Embodiment 3 is the projector of embodiment 1, wherein the beamsplitter comprises a first prism and a second prism disposed on opposite sides of the reflective polarizer.

Embodiment 4 is the projector of embodiment 3, wherein the first and second prisms have respective first and second hypotenuse lengths HL1 and HL2, and wherein 40%<HL1/HL2<70%.

Embodiment 5 is the projector of embodiment 3, wherein the first and second prisms have respective first and second prism heights H1 and H2, and wherein 40%<H1/H2<70%.

Embodiment 6 is the projector of embodiment 1, wherein the projector lens has a maximum lateral dimension LD1 and the spatial light modulator has a maximum lateral dimension LD2, and wherein LD1 is less than LD2.

Embodiment 7 is the projector of embodiment 6, wherein 30%<LD1/LD2<70%.

Embodiment 8 is the projector of embodiment 1, wherein the light source comprises an LED die and a polarizer, and wherein the input light beam is polarized.

Embodiment 9 is the projector of embodiment 1, wherein the projector further comprises a detector to receive light originating from a body outside of the projector through the projector lens.

Embodiment 10 is a compact projector, comprising: a reflective polarizer obliquely disposed to define a diagonal of a first rectangular reference space; a light source disposed proximate the reflective polarizer, the light source configured to emit an input light beam towards the reflective polarizer; a spatial light modulator disposed to receive an output illumination beam derived from the input light beam, the spatial light modulator adapted to selectively reflect the output illumination beam to provide a patterned light beam; a projector lens adapted to receive the patterned light beam; wherein at least a portion of the light source, or at least a portion of the projector lens, is disposed within the first rectangular reference space.

Embodiment 11 is the projector of embodiment 10, wherein the at least a portion of the light source and the at least a portion of the projector lens are both disposed within the first rectangular reference space.

Embodiment 12 is the projector of embodiment 10, wherein only one of the at least a portion of the light source and the at least a portion of the projector lens is disposed within the first rectangular reference space.

Embodiment 13 is the projector of embodiment 11, wherein the reflective polarizer divides the first rectangular reference space into a first portion and a second portion, and wherein the at least a portion of the light source, or the at least a portion of the projector lens, is disposed within the first portion of the first rectangular reference space.

Embodiment 14 is the projector of embodiment 13, wherein the at least a portion of the light source and the at least a portion of the projector lens are both disposed within the first portion of the first rectangular reference space.

Embodiment 15 is the projector of embodiment 10, wherein the light source comprises an LED die, and wherein the LED die is entirely disposed within the first rectangular reference space.

Embodiment 16 is the projector of embodiment 10, wherein the projector lens comprises a plurality of individual lenses in series, and wherein at least one of the individual lenses is entirely disposed within the first rectangular reference space.

Embodiment 17 is the projector of embodiment 10, wherein the reflective polarizer is part of a beamsplitter that also includes a first and second prism disposed on opposite sides of the reflective polarizer.

Embodiment 18 is the projector of embodiment 17, wherein the first and second prisms have respective first and second hypotenuse lengths HL1 and HL2, and wherein 40%<HL1/HL2<70%.

Embodiment 19 is the projector of embodiment 17, wherein the first and second prisms have respective first and second prism heights H1 and H2, and wherein 40%<H1/H2<70%.

Embodiment 20 is the projector of embodiment 10, wherein the projector lens has a maximum lateral dimension LD1 and the spatial light modulator has a maximum lateral dimension LD2, and wherein LD1 is less than LD2.

Embodiment 21 is the projector of embodiment 20, wherein 30%<LD1/LD2<70%.

Embodiment 22 is the projector of embodiment 10, wherein the projector further comprises a detector to receive light originating from a body outside of the projector through the projector lens.

Embodiment 23 is a polarizing beamsplitter, comprising: a first prismatic body comprising a first prism; a second prismatic body comprising a second prism; and a reflective polarizer sandwiched between the first and second prismatic bodies; wherein the first prism is substantially smaller than the second prism.

Embodiment 24 is the beamsplitter of embodiment 23, wherein the first and second prisms have respective first and second hypotenuse lengths HL1 and HL2, and wherein 40%<HL1/HL2<70%. Embodiment 25 is the beamsplitter of embodiment 23, wherein the first and second prisms have respective first and second prism heights H1 and H2, and wherein 40%<H1/H2<70%.

Embodiment 26 is the beamsplitter of embodiment 23, wherein the beamsplitter is configured such that light that passes through the first prismatic body passes predominantly through the first prism.

Embodiment 27 is the beamsplitter of embodiment 26, wherein the reflective polarizer comprises a first major surface facing the first prismatic body, and wherein the first prismatic body covers most of the first major surface.

Embodiment 28 is the beamsplitter of embodiment 27, wherein the first prismatic body covers substantially all of the first major surface.

Embodiment 29 is the beamsplitter of embodiment 23, wherein the first prismatic body comprises at least one prism other than the first prism.

Embodiment 30 is the beamsplitter of embodiment 23, wherein the first prismatic body comprises no prisms other than the first prism.

Embodiment 31 is a compact polarized illuminator, comprising: a reflector; a reflective polarizer disposed to form a reflective cavity with the reflector; a retarder film disposed within the reflective cavity; and a light source disposed to emit a polarized input light beam into the reflective cavity through an aperture in the reflector; wherein the reflector, the reflective polarizer, and the retarder film are configured to produce an output illumination beam from the input light beam, and wherein the output illumination beam is polarized.

Embodiment 32 is the illuminator of embodiment 31, wherein at least one of the reflector and the reflective polarizer is curved, and wherein the output illumination beam is converging.

Embodiment 33 is the illuminator of embodiment 31, wherein light follows a light path from the light source to the output illumination beam that includes passing through the aperture, reflecting from the reflective polarizer, reflecting from the reflector, passing through the reflective polarizer, and passing at least two times through the retarder film.

Embodiment 34 is the illuminator of embodiment 31, wherein the reflective cavity defines a cavity volume, and a majority of the cavity volume comprises at least one solid light-transmissive material.

Embodiment 35 is the illuminator of embodiment 31, wherein the reflective cavity defines a cavity volume, and a majority of the cavity volume comprises air or vacuum.

Embodiment 36 is the illuminator of embodiment 31, wherein the retarder film is proximate the reflector, and the aperture is also in the retarder film.

Embodiment 37 is the illuminator of embodiment 31, wherein the illuminator further comprises a scattering element to make the output illumination beam more spatially uniform.

Embodiment 38 is the illuminator of embodiment 37, wherein the scattering element comprises a roughened surface, and the roughened surface is part of the reflective cavity.

Embodiment 39 is the illuminator of embodiment 37, wherein the scattering element comprises a layer of scattering material within the reflective cavity.

Embodiment 40 is the illuminator of embodiment 31, wherein the light source comprises an LED and a polarizer.

Embodiment 41 is a compact polarized illuminator, comprising: a reflector; a reflective polarizer disposed obliquely relative to the reflector; a retarder film disposed between the reflector and the reflective polarizer; and a light source disposed to emit an input light beam of a first polarization state through the reflective polarizer towards the reflector; wherein the reflector, the reflective polarizer, and the retarder film are configured to produce an output illumination beam from the input light beam, and wherein the output illumination beam has a second polarization state orthogonal to the first polarization state.

Embodiment 42 is the illuminator of embodiment 41, wherein the reflective polarizer is part of a beamsplitter that also includes a first and second prism disposed on opposite sides of the reflective polarizer.

Embodiment 43 is the illuminator of embodiment 42, wherein the first and second prisms have respective first and second hypotenuse lengths HL1 and HL2, and wherein 40%<HL1/HL2<70%.

Embodiment 44 is the illuminator of embodiment 42, wherein the first and second prisms have respective first and second prism heights H1 and H2, and wherein 40%<H1/H2<70%.

Embodiment 45 is a projector, comprising: the polarized illuminator of embodiment 31; a spatial light modulator disposed to intercept the output illumination beam so as to produce a spatially patterned beam; and a projector lens to receive the spatially patterned beam.

Embodiment 46 is the projector of embodiment 45, wherein the spatial light modulator is a transmissive spatial light modulator.

Embodiment 47 is the projector of embodiment 45, wherein the spatial light modulator is a reflective spatial light modulator.

Embodiment 48 is the projector of embodiment 45, wherein the projector lens has a maximum lateral dimension LD1 and the spatial light modulator has a maximum lateral dimension LD2, and wherein LD1 is less than LD2.

Embodiment 49 is the projector of embodiment 45, wherein the projector further comprises a detector to receive light originating from a body outside of the projector through the projector lens.

Embodiment 50 is a projector, comprising: the polarized illuminator of embodiment 41; a spatial light modulator disposed to intercept the output illumination beam so as to produce a spatially patterned beam; and a projector lens to receive the spatially patterned beam.

Embodiment 51 is the projector of embodiment 50, wherein the spatial light modulator is a reflective spatial light modulator.

Embodiment 52 is the projector of embodiment 50, wherein the projector lens has a maximum lateral dimension LD1 and the spatial light modulator has a maximum lateral dimension LD2, and wherein LD1 is less than LD2.

Embodiment 53 is the projector of embodiment 50, wherein the projector further comprises a detector to receive light originating from a body outside of the projector through the projector lens.

Various modifications and alterations of this invention will be apparent to those skilled in the art without departing from the spirit and scope of this invention, and it should be understood that this invention is not limited to the illustrative embodiments set forth herein. The reader should assume that features of one disclosed embodiment can also be applied to all other disclosed embodiments unless otherwise indicated. It should also be understood that all U.S. patents, patent application publications, and other patent and nonpatent documents referred to herein are incorporated by reference, to the extent they do not contradict the foregoing disclosure.

The invention claimed is:

1. A polarizing beamsplitter comprising:
   first and second prisms disposed entirely within a rectangular reference space, the first prism substantially smaller than the second prism;
   a reflective polarizer co-extensive with a diagonal of the rectangular reference space and disposed between, and bonded to, the first and second prisms; and
   a light source disposed entirely within the rectangular reference space proximate an input surface of the first prism and configured to emit polarized light into the first prism.

2. The polarizing beamsplitter of claim 1, further configured to produce an output illumination beam from the polarized light.

3. The polarizing beamsplitter of claim 2, wherein the light follows a path from the light source to the output illumination beam that includes reflecting from the reflective polarizer at least once and passing through the reflective polarizer at least once.

4. The polarizing beamsplitter of claim 3, wherein the polarizing beamsplitter further comprises a scattering element to make the output illumination beam more spatially uniform.

5. The polarizing beamsplitter of claim 4, wherein the scattering element comprises a layer of scattering material.

6. The polarizing beamsplitter of claim 1, wherein the light source comprises an LED and a polarizer.

* * * * *